United States Patent
Cook et al.

(10) Patent No.: US 11,475,726 B1
(45) Date of Patent: Oct. 18, 2022

(54) END TO END VERIFICATION OF AN ELECTION RUN OVER A PUBLIC NETWORK

(71) Applicant: Vidaloop, Inc., La Mesa, CA (US)

(72) Inventors: Ryan Scott Cook, La Mesa, CA (US); David Wallick, Denver, CO (US)

(73) Assignee: Vidaloop, Inc., La Mesa, CA (US)

( * ) Notice: Subject to any disclaimer, the term of this patent is extended or adjusted under 35 U.S.C. 154(b) by 0 days.

(21) Appl. No.: 17/472,443

(22) Filed: Sep. 10, 2021

Related U.S. Application Data

(60) Provisional application No. 63/226,697, filed on Jul. 28, 2021.

(51) Int. Cl.
  *G07C 13/00* (2006.01)
  *H04L 9/32* (2006.01)

(52) U.S. Cl.
  CPC ............ *G07C 13/00* (2013.01); *H04L 9/3234* (2013.01); *H04L 9/3263* (2013.01); *H04L 2209/463* (2013.01)

(58) Field of Classification Search
  CPC ..... G07C 13/00; H04L 9/3234; H04L 9/3263; H04L 2209/463
  USPC ............................................... 235/54; 705/12
  See application file for complete search history.

(56) References Cited

U.S. PATENT DOCUMENTS

| | | |
|---|---|---|
| 9,727,883 B2 | 8/2017 | Richardson |
| 11,362,844 B1 | 6/2022 | Cook |
| 2005/0167484 A1* | 8/2005 | Sussman ............... G07F 7/1008 235/380 |
| 2010/0268942 A1 | 10/2010 | Hernandez |
| 2012/0233253 A1 | 9/2012 | Ricci |
| 2015/0085993 A1* | 3/2015 | Scheib ................. A61N 5/1071 378/207 |
| 2018/0004953 A1 | 1/2018 | Smith |
| 2018/0034646 A1 | 2/2018 | Kuramoto |
| 2020/0258338 A1* | 8/2020 | Goswami ............. H04L 9/3247 |
| 2020/0382294 A1* | 12/2020 | Pilozzi ................. H04L 9/0894 |
| 2021/0319642 A1* | 10/2021 | Boyd ..................... G07C 13/00 |

\* cited by examiner

Primary Examiner — Zeshan Qayyum
(74) Attorney, Agent, or Firm — Carr & Ferrell LLP

(57) ABSTRACT

Systems and methods for providing an end to end verification of an election run over a public network are disclosed. An example method includes generating, by an election management system (EMS), EMS private keys and EMS certificates; generating, by a security device (SD), an SD private key and an SD certificate, the SD private key and the SD certificate being generated based on a root private key; signing, by the SD, the EMS certificates using the SD private key; upon receiving, by the SD, node settings signed by EMS certificates; signing the node settings and generating, for each of nodes of an election data storage, a package including a node private key, a node certificate, the EMS certificates, and the SD certificate; upon receiving, by the SD, election data signed by EMS certificates, signing the election data and generating and signing tokens including election identifications and voter identifications.

18 Claims, 21 Drawing Sheets

1800

```
┌─────────────────────────────────────────────────┐
│ Generate, by an election management system (EMS), EMS │
│           private keys and EMS certificates           │
│                        1805                           │
└─────────────────────────────────────────────────┘
                          │
                          ▼
┌─────────────────────────────────────────────────┐
│ Generate, by a security device (SD), SD private key and a SD │
│       certificate using a root private key            │
│                        1810                           │
└─────────────────────────────────────────────────┘
                          │
                          ▼
┌─────────────────────────────────────────────────┐
│   Sign, by the SD, the EMS certificates using the SD private key │
│                        1815                           │
└─────────────────────────────────────────────────┘
                          │
                          ▼
┌─────────────────────────────────────────────────┐
│ Sign, by the SD, the node settings using the SD private key and │
│ generate, by the SD, a package for each node of an election data │
│                       storage                         │
│                        1820                           │
└─────────────────────────────────────────────────┘
                          │
                          ▼
┌─────────────────────────────────────────────────┐
│ Sign, by the SD, the election data using the SD private key and │
│   generate, by the SD, a token signed by the SD private key    │
│                        1825                           │
└─────────────────────────────────────────────────┘
```

*FIG. 18*

END TO END VERIFICATION OF AN ELECTION RUN OVER A PUBLIC NETWORK

CROSS-REFERENCE TO RELATED APPLICATION

The present application claims the benefit of U.S. Provisional Application No. 63/226,697, filed on Jul. 28, 2021, and titled "End-to-End Verifiable Proof of Votes Cast in Elections." The subject matter of the aforementioned application is incorporated herein by reference for all purposes.

TECHNICAL FIELD

The present disclosure relates generally to data processing and, more particularly, to systems and methods for providing end to end verification of an election run over a public network.

BACKGROUND

Public elections in the United States consist primarily of poll station in-person voting either on paper ballots or on highly controlled and monitored electronic machines. Vote-by-mail paper ballot voting has not been widely adopted except in a few states prior to the 2020 election. Overseas voters covered by the Uniformed and Overseas Citizens Absentee Voting Act (UOCAVA) vote primarily on paper even if some portions of the process are done electronically. These methods have been highly refined for security, accessibility, and privacy concerns over time but, in most cases, designing for one group of requirements often means sacrificing another group of requirements, or at best, settling for less than ideal solutions in some areas to accommodate other areas. For example, paper ballots offer high verifiability and accuracy, especially in post-election audits, but can be difficult to use for certain voter populations as well as having high costs associated with delivery and return in non-poll station applications done at scale. Often times, security of these paper systems relies on physical security, or on process procedures that work well but focus primarily on tamper prevention principles and cannot provide direct ballot-by-ballot verifiability to individual voters. None of these systems offers voter verifiability from beginning to end of the voting process, from ballot marking and casting to tabulation. Thus, the challenge of voting on public networks is combining the necessary security and vote verifiability with the need to keep individual voter selections private.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to an example embodiment, a system for providing end to end verification of an election run over a public network is disclosed. The system may include an election data storage comprising one or more nodes. The system may include an election management system (EMS) configured to generate EMS private keys and EMS certificates. The system may include a security device (SD). The SD can be configured to generate an SD private key and an SD certificate, where the SD private key and the SD certificate are generated based on a root private key. The SD can be configured to sign the EMS certificates using the SD private key. Upon receiving node settings signed by the EMS certificates, the SD can sign the node settings using the SD private key and generate a package for each node. The package may include a node private key, a node certificate, the EMS certificates, and the SD certificate. Upon receiving election data signed by EMS certificates, the SD can sign the election data using the SD private key and generate at least one token signed using the SD private key. The token may include at least an election identification and a voter identification.

The SD private key can be unremovable from the SD and inaccessible by a software application. The election data between the SD and the EMS can be transferred via a non-networked data transfer. The package between the SD and the nodes of the election storage data can be transferred via a non-networked data transfer. The election data between the EMS and the nodes can be transferred via a networked data transfer.

Upon receiving the election data, the nodes of the election data storage can verify the election data using a chain including the EMS certificates and the SD certificates.

An example system may include a voter device. The voter device can obtain the election identification and the voter identification from the at least one token. The voter device can send, based on the election identification and the voter identification, a request to the election data storage to receive a ballot. The voter device may provide a user interface enabling a voter to enter a choice on the ballot to form a cast vote record. The voter can send the cast vote record to the election data storage.

The token can be provided to the voter by mail. The token may include a QR code. The voter device may include a mobile device configured to read the QR code.

The system may include an election registry. Upon receiving registry settings signed with the EMS certificates, the SD can generate a registry private key and a registry certificate. The election registry can receive and store the registry private key, the registry certificate signed by the SD, the SD certificate, the EMS certificates, and the registry settings. Upon receiving updated settings signed by the EMS, the election registry can verify the updated settings using a chain including the EMS certificates and the SD certificate.

The voter device can send the election identification and the voter identification to the election registry. The election registry can verify the election identification and the voter identification using the SD certificate. The election registry can determine, based on registry settings, a node identification associated with the election identification and the voter identification. The election registry can then send the node identification and the SD certificate to the voter device. The voter device can include the node identification in the request to the election data storage. The election registry can determine a language package associated with the election identification and the voter identification and send the language package to the voter device.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements.

FIG. 18 is a flow chart showing a method for end to end verification of an election run over a public network, according to an example embodiment.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

The present disclosure is directed to an end to end verification of an election run over a public network. Systems and methods disclosed herein may provide solutions for data integrity, vote verifiability, and maintaining voter anonymity. Embodiments of the present disclosure may include a combination of a custom hardware device and specific software operations to create the cryptographic root of trust for the election system and a series of intermediate certificates used to verify data as the data are passed between components of the election system and the voter device. This root of trust branches out to all other components such that all data transfers can be verified as authentic to the system and unaltered at any point. Voter anonymity is retained by keeping voter records only within a security device, inaccessible to all users except when used to run specific elections operations.

Embodiments of the present disclosure may provide a cryptographic hardware chip designed specifically for securing keys and sensitive data, cryptographic conventions such as Elliptic Curve Digital Signature Algorithm (ECDSA) with SHA-256 for signing and encrypting data with industry standard ciphers, standard certificate chain of trust processes, and the use of blockchain as the ballot box ledger. Embodiments of the present disclosure may use multiple redundant and complementary cryptographic, so even if future research discovers vulnerabilities in any of the technologies used, other pieces may help mitigate issues until replacement solutions can be found for compromised pieces.

Embodiments of the present disclosure may allow voters to use their own smart phones or computers to vote remotely, which may help avoiding requirements for centralized voting or paper ballots. Using a combination of security certificates, blockchain, and other cryptographic technologies, the system creates a robust end to end solution that is verifiable and secure over public networks, allowing voters to use their own smart phones or computers to vote remotely. Controlling the data eliminates the need to control the hardware used by the voters.

Figure 1:
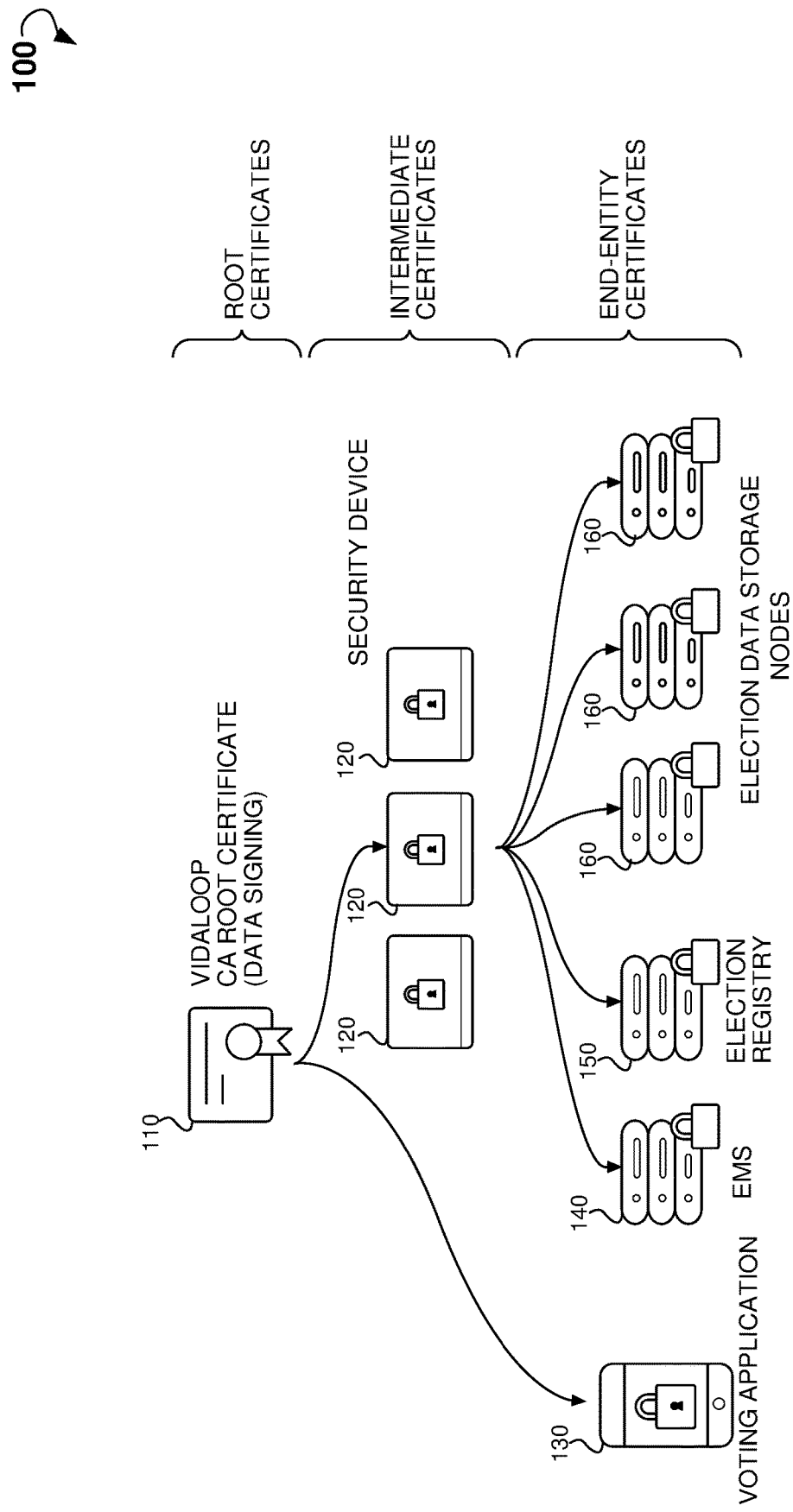
FIG. 1 is a block diagram of certificate distribution in an election system, according to some example embodiments.

FIG. 1 is a block diagram of certificate distribution in an election system 100, according to some example embodiments. The election system 100 may include one or more security device(s) (SDs) 120, one or more voting applications 130 running on voter devices, an election management system (EMS) 140, an election registry, and an election data storage including one or more nodes 160.

The EMS 140 may include an EMS workstation and an EMS server. The EMS 140 may receive an election data received from an election official. The election data may include voter lists, date, time, and location of the election, ballot designs, settings for the nodes 160 and the election registry 150, and so forth.

The SD 120 can be configured to generate and store SD private key, SD public key, and intermediate SD certificates. The SD 120 may also sign or generate private keys, public keys, and certificates for EMS 140, election registry 150, and nodes 160 of the election data storage.

The voting application 130 can be run on a voter device, for example, a mobile device of a voter. The voting application 130 can be used by a voter to receive a ballot and select a choice in the ballot. The voting application 130 can send the result of voter selection to the nodes 160.

The election registry 150 may store election data. The voting application 130 may request that election registry 150 provide information concerning elections. For example, the election registry 150 may provide language packages and identification of nodes to which the voting application 130 is to send a request for a ballot.

The election data storage may include any data storage configured to store immutable data. In some embodiments, the nodes 160 election data storage may include blockchain nodes.

The election system 100 may include root certificates, intermediate certificates, and end-entity certificates to establish a chain of trust. The chain of trust can rely on only one element of social trust, which is to handle the root certificate 110 and the provisioning of the SD 120. The SD 120 may become the "Root of Trust" for the election system 100. The SD 120 may contain an intermediate certificate. The intermediate certificate can be created and signed during provisioning of the SD 120. After the provisioning the SD 120 is completed, the SD 120 may act as a Certificate Authority (CA) to issue certificates to other entities of the election system 100, that is to process Certificate Signing Requests (CSRs), and by doing so delegate trust to other entities. These certificates can only be used for signing and verifying data and the data source throughout the election system 100.

Root certificate issuer (Vidaloop) may delegate trust to the SD 120, which in turn delegates trust to various entities of the election system 100, such as EMS 140, the election registry 150, and the nodes 160 of the election data storage. In the most cases throughout the election system 100 the trust can be established by verifying that the source of the data has a certificate signed by the SD 120. There can be exceptions to this process of verification for some participants of election process, for example, the mobile application 130. In this case, the mobile application 130 may confirm that it can trust the election system 100 or data by examining the chain of trust and confirming that the root of trust is a trusted source (root certificate issuer). The mobile application can then trust the source's identity and use the provided public key to verify the signature proving authenticity.

The root certificate issuer may create intermediate certificates to sign data packages that are globally hosted and shared, such as language packs. This can be done to reduce the risk associated with having the root sign data directly. The industry standard audit "AICPA/CICA WebTrust Program for Certification Authorities" can verify certificate usages and ability to do revocations.

In some embodiments, root certificate and intermediate certificates can be published to a known location on the internet. Thus, if an entity of the election system 100 encounters a certificate where the signer is unknown, the entity can perform a lookup to find out whether the certificate is associated with a trusted source and if so, download and persist the certificate. However, because the certificates are created and available at the time of the primary election, the public keys and certificates can be included in the installation packages of the election system 100.

The EMS's certificates can be provisioned during the device registration process. The election registry 150 may have a copy of the certificates of the SD 120 and EMS 150. This can be required to accept an update data from the SD 120 and the EMS 140. The certificates can be collected in a package to be installed by a system operator on the EMS 140, the SD 120, and the election registry 150. The EMS 140 and the SD 120 can be collocated in one geographical place, building, or room. The election registry 150 and election data storage (nodes 160) can be located in different places remote with respect to the location of the EMS 140 and the SD 120.

The election data storage nodes 160 can require SD certificates, EMS certificates, network authentication certificates, and encryption certificates. These certificates can be included in a package created for an operator that can install the package on nodes 160. For example, if the election data storage includes a blockchain, the package can be installed on the blockchain's genesis block.

Figure 2:
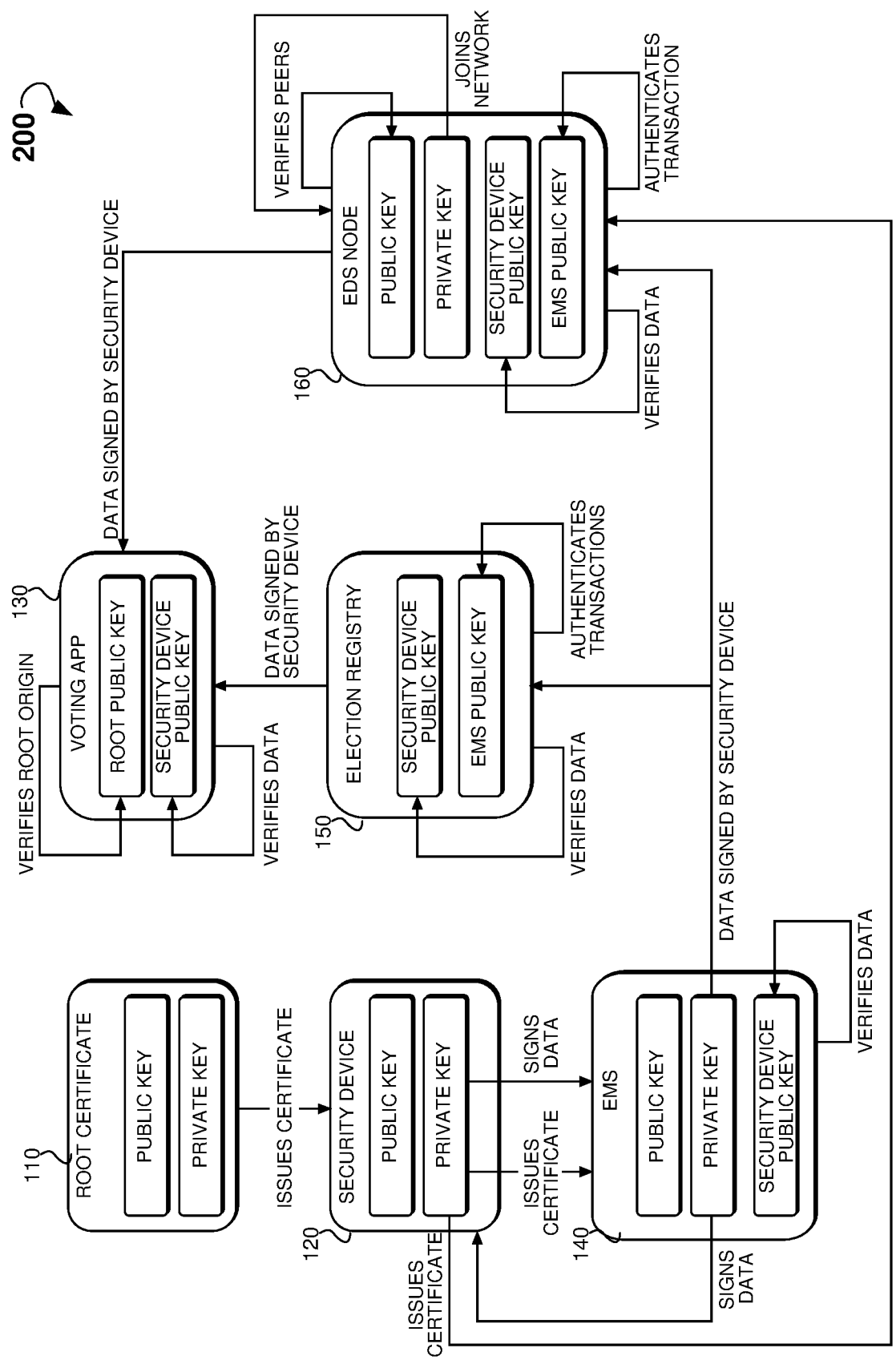
FIG. 2 is a high-level block diagram showing data storage in an election system, according to an example embodiment.

FIG. 2 is a high-level block diagram showing data flow 200 in an election system, according to some example embodiments. Not all communication paths described in FIG. 2 are being used simultaneously but rather differently during pre-election, live election, and post-election activities. Data within the election system 100 system can be stored and transported in such a way that the origin of the data can be traced and that the contents cannot be tampered with. Within the election system 100, data can be verified through confirming that it is signed by a trusted source.

Data within the election system 100 can be transported by non-networked means as well as across public networks. Multiple methods of verification can be used for all operations such that a single participant or entity of the election system 100, if compromised, cannot damage the integrity of the election system 100.

The root certificate 110 may include private key and public key. The SD 120 may keep an SD public key and SD private key. The EMS 140 may keep the SD public key, EMS private key, and EMS public key. The election registry 150 may keep the SD public key and EMS public key. A node 160 of election data storage may keep a node public key, node private key, SD public key, and EMS public key.

Figure 3:
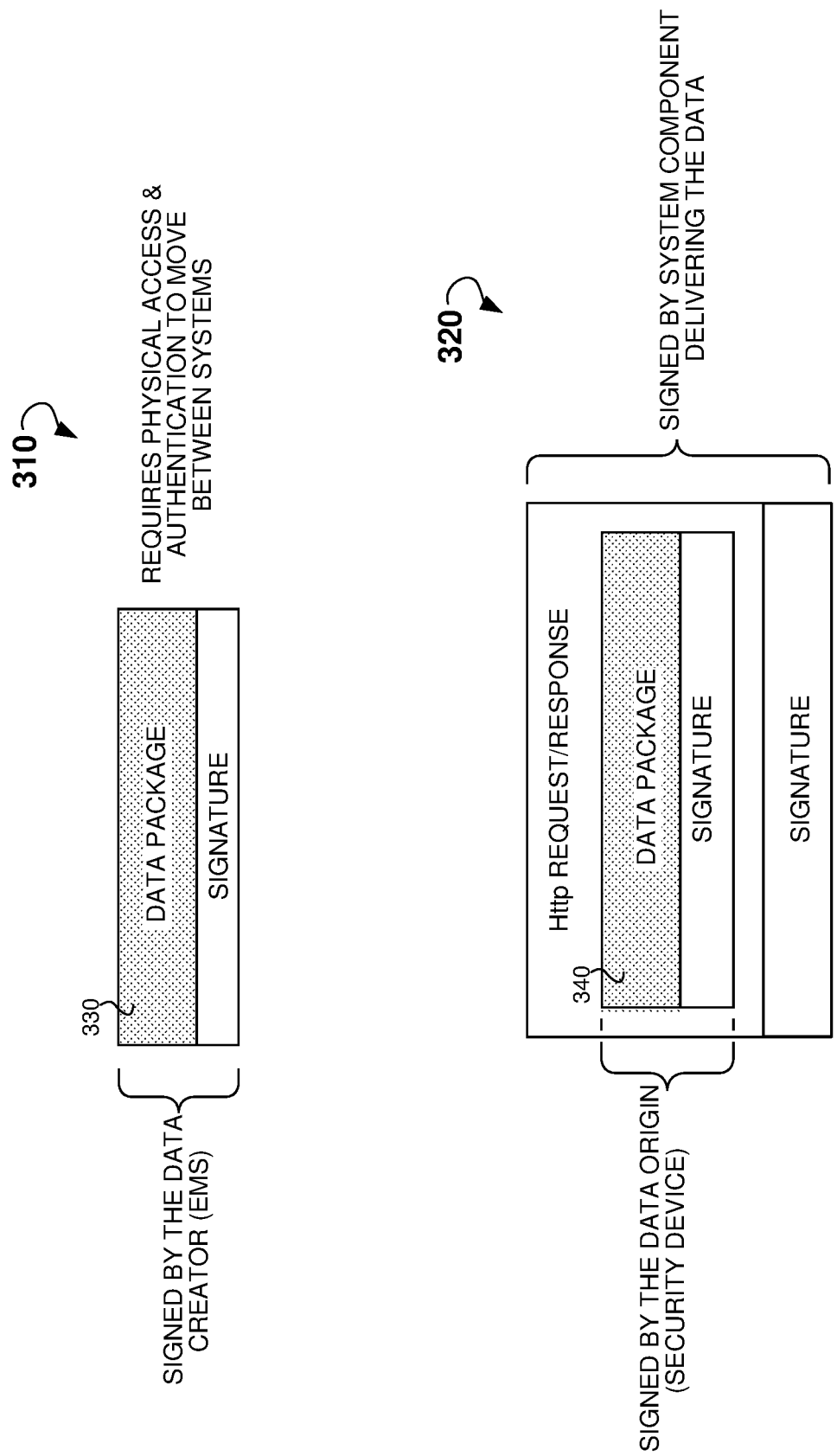
FIG. 3 is a high-level block diagram showing a non-networked data package and a networked data package, according to an example embodiment.

FIG. 3 is a high-level block diagram showing a non-networked data package 310 and a networked data package 320, according to an example embodiment. The non-networked data can be physically transferred between locations and systems on secure USB drives. The systems involved can be configured with the keys and certificates needed to verify and decrypt data from approved sources. The data packages can be generated for a specific recipient.

The non-networked data package 310 can be signed by a creator of data package 320. The non-networked data package requires physical access to the exporting and importing devices. Importing devices may verify the source and integrity of the package.

The networked data package 320 may include a data package 340 signed by a creator of the data, such as the EMS 140 or the SD 120. The networked data package 320 can be signed by a device delivering the data over networks. Hypertext Transfer Protocol (HTTP) signature can be used to verify the identity of the device delivering or requesting data and to verify the integrity of the data transport. Data package signature can be used to verify the origin of the data, which is a known and trusted source, such as a SD 120. The data package signature can be also used to verify the integrity of the data.

To create the network depicted in FIG. 1, the entities can be provisioned in a specific order. Provisioning in the specific order may allow each entity to share certificates with one another such that data transfers between components can be verified as authentic and that the integrity of the data has not been compromised. Some provisioning can be done once in the lifetime of the component while other provisioning can be done on an election by election basis.

Figure 4:
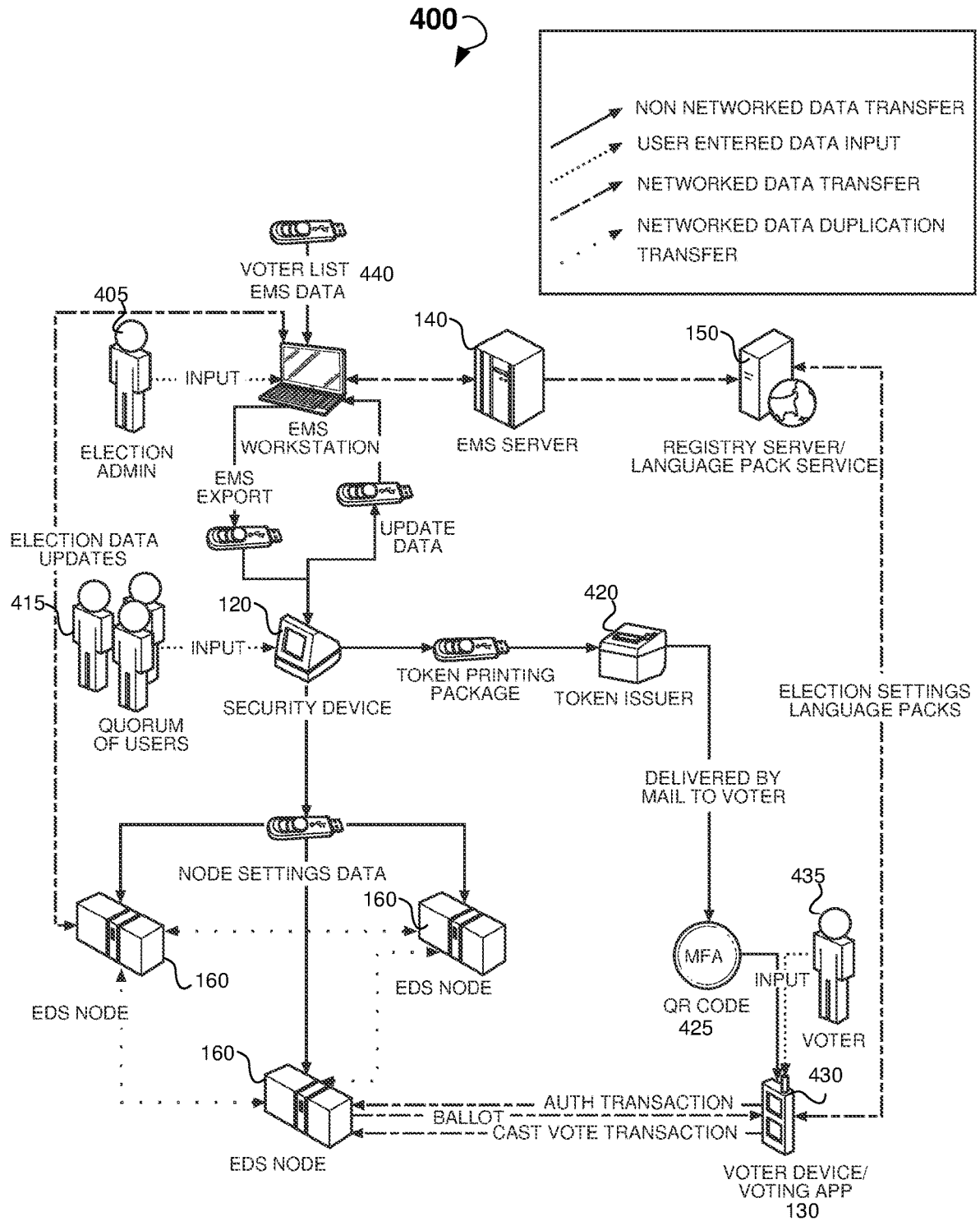
FIG. 4 is a high-level block diagram showing data transfer in an election system, according to some example embodiments.

FIG. 4 is a high-level block diagram showing data transfer in an election system, according to some example embodiments. In the FIG. 4, an election administrator 405 maybe associated with an EMS workstation 405. Data from the EMS workstation 405 may be received by the EMS 140, which may further provide the data to the election registry 150. A quorum of users 415 can be associated with SD 120. The SD 120 may provide data to a token issuer 420. The token issuer 420 may generate a QR code 425 and provide the QR code 425 to a voter device 430 associated with a voter 435. The voter device 430 may have the voting application 130 running on the voter device 430. The EMS workstation 405, the security device 420, and the voter device 430 may be in communication with nodes 160 of the election data storage. The voter device 430 may be in communication with the election registry 150. The election data storage 160 may also store a voter list/EMS data 440.

As shown in FIG. 4, data between the SD 120 and the nodes 160, data between EMS workstation and the SD 120, and data between the SD and election registry are transferred via non networked data transfer, for example via securely signed USB drives. The data between the nodes 160 are transferred via networked data duplication transfer. The data between the SD and EMS and data between the EMS and the nodes 160 are transferred via networked data duplication transfer. Further details of data flow are provided in FIGS. 5-11.

Figure 5:
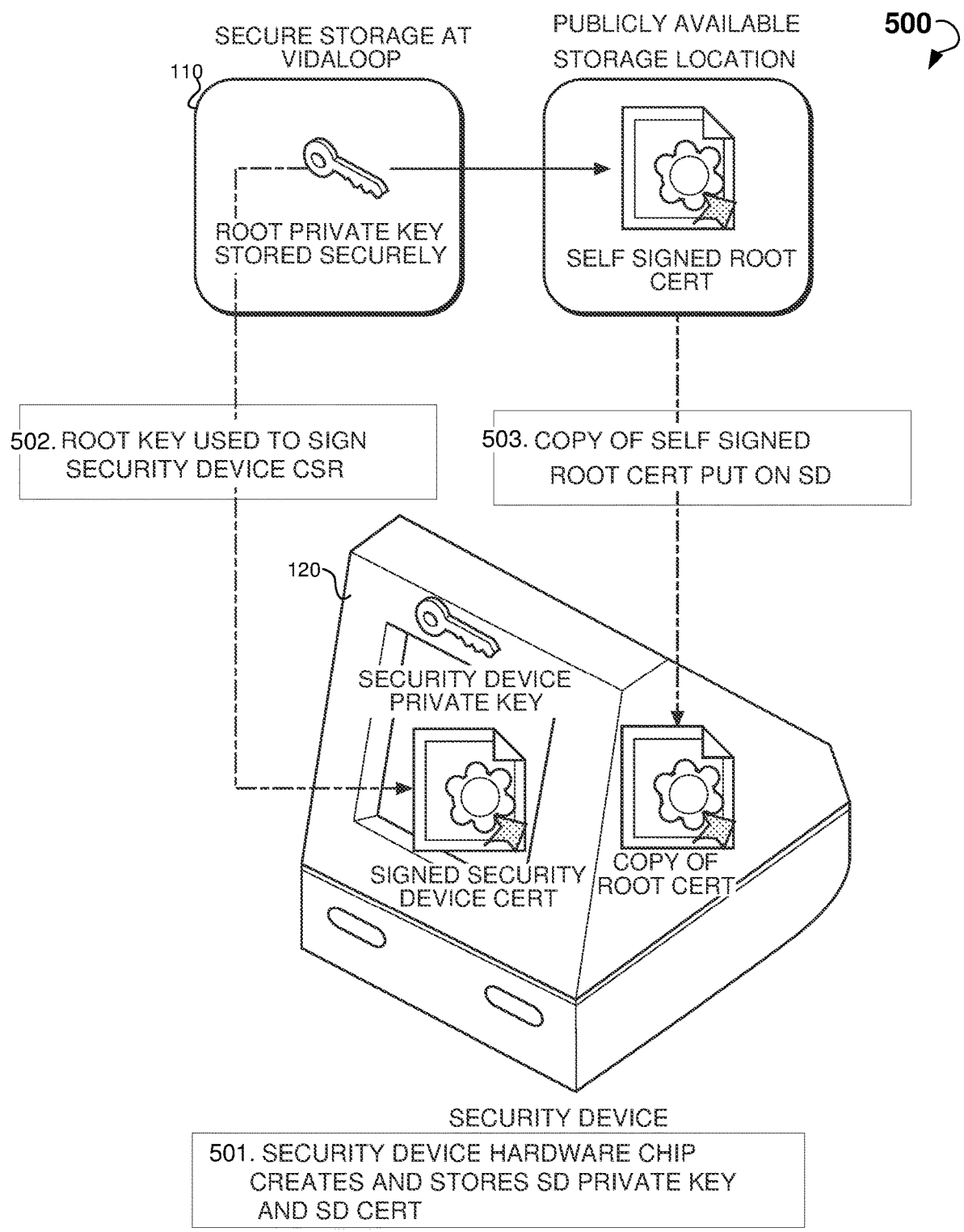
FIG. 5 is a high-level block process diagram showing steps of process for provisioning SD, according to an example embodiment.

FIG. 5 is a high-level block process diagram showing steps of process 500 provisioning SD 120, according to an example embodiment. In step 501, a hardware chip of the SD 120 can generate an SD private key and an SD certificate. In step 502, a root key stored securely by root certificate issuer (CA) can be used to sign a CSR from SD. In step 503, a copy of self-signed root certificate can be provided to the SD 120. The self-signed root certificate can be also kept at publicly available storage.

Figure 6:
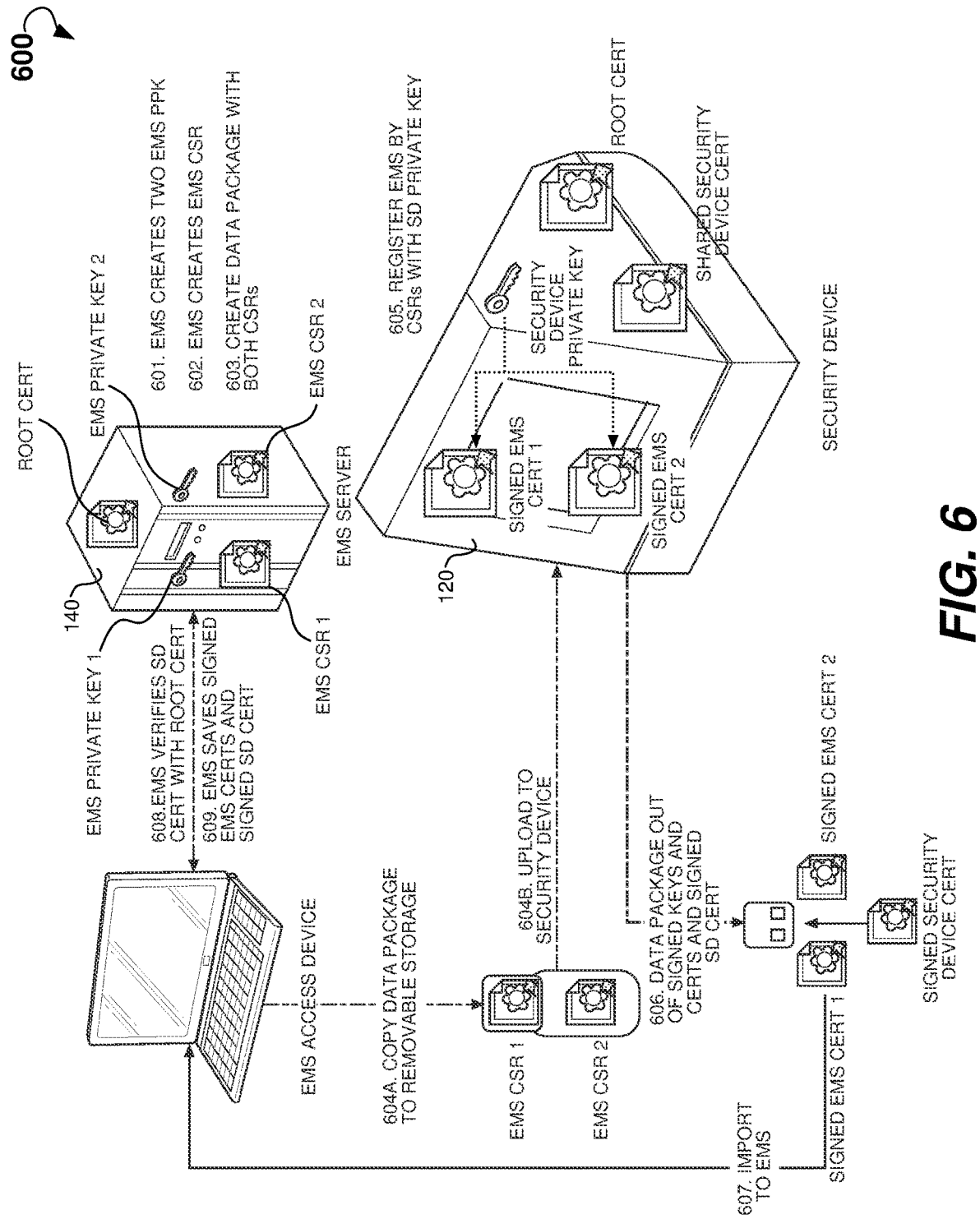
FIG. 6 is a high-level process diagram showing steps of a process for provisioning election EMS, according to an example embodiment.

FIG. 6 is a high-level process diagram showing steps of process 600 of provisioning EMS 140, according to an example embodiment. In step 601, EMS 140 may create two pairs of EMS public and private keys. In step 602, EMS 140 may create EMS CSRs for signing the two pairs of EMS public and private keys. In step 603, the EMS 140 may create data package including both CSRs. In step 604a, the data package can be copied to a removable data storage. In step 604b, the data package can be uploaded to the SD 120. In step 605, the SD 120 may register the EMS 140 by signing CSRs with an SD private key. In step 606, an outcoming data package can be copied to a removable data storage. The outcoming data package may include signed EMS keys, signed EMS certificates, and signed SD certificate. In step 607, the outcoming data package can be imported to the EMS 140. In step 608, the EMS 140 may verify the SD certificate using a root certificate. In step 609, EMS 140 may store signed EMS certificates and signed SD certificate.

Figure 7:
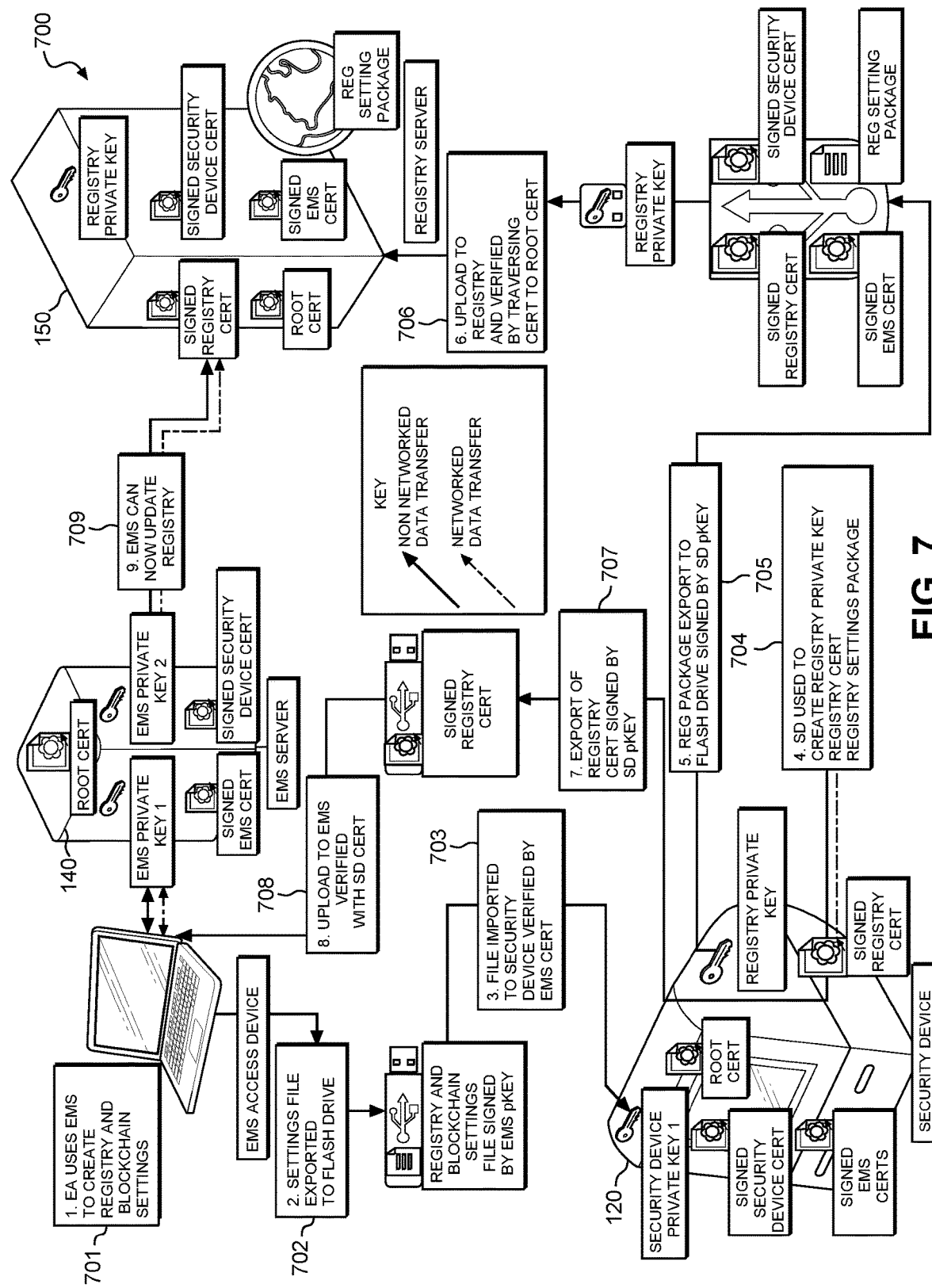
FIG. 7 is a high-level block diagram showing steps of a process for provisioning election registry, according to an example embodiment.

FIG. 7 is a high-level block diagram showing steps of process 700 of provisioning election registry 150, according to an example embodiment. In step 701, an election administrator may use EMS 140 to create registry settings and node settings. In step 702, a file containing the registry settings and the node settings can be exported to a removable storage (e.g., a flash drive). In step 703, the file containing the registry settings and the nodes settings can be imported to the SD 120. In step 704, the SD 120 may be used to create and sign registry private key and registry certificate and include these keys in a registry settings package. In step 705, the registry settings package can be exported to a removable storage (a flash drive). In step 706, the registry settings package can be uploaded to the election registry 150 and verified by traversing a chain of certificates to the root certificate. In step 707, the registry certificate signed by the SD private key can be exported to another removable storage (a flash drive). In step 708, the registry certificate can be uploaded to EMS 140 and verified using an SD certificate. In step 709, the EMS 140 can update registry settings via a network data transfer.

Figure 8:
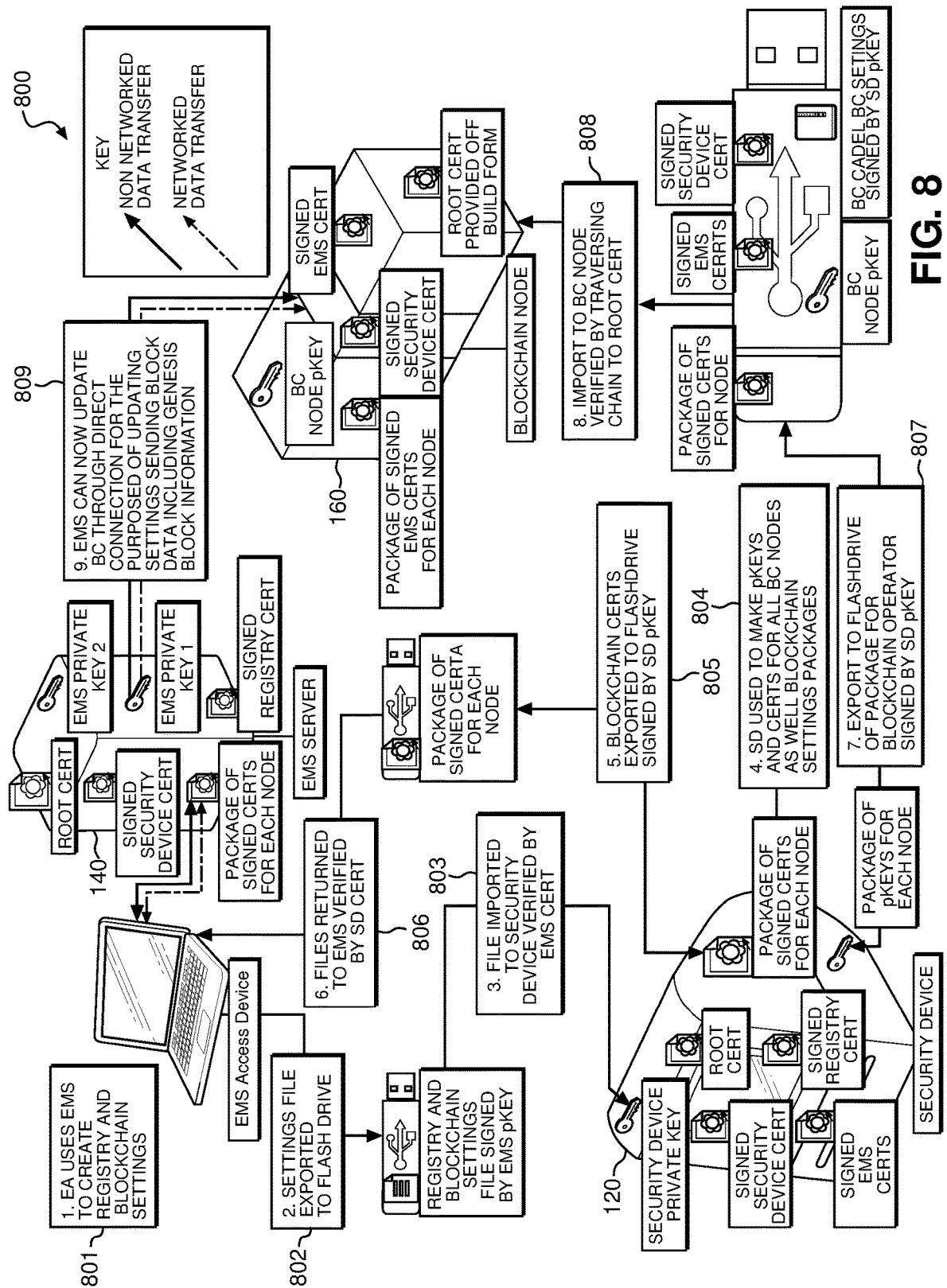
FIG. 8 is a high-level block diagram showing steps of a process of provisioning nodes of an election data storage, according to an example embodiment.

FIG. 8 is a high-level block diagram showing steps of process 800 of provisioning nodes 160 of election data storage, according to an example embodiment. In step 801, an election administrator may use EMS 140 to create registry and nodes settings. In step 802, a file containing registry settings and nodes settings can be exported to a removable storage (e.g., a flash drive). The file can be signed by EMS certificates. In step 803, the file containing registry settings and nodes settings can be imported to the SD 120 and verified with EMS certificates. In step 804, SD 120 can be used to create and sign private keys and certificates for each of the nodes 160 and include these keys and certificates in node settings packages. In step 805, the node certificates signed by the SD private key can be exported from the SD 120 to a removable storage (e.g., a flash drive). In step 806, the node certificates can be uploaded to EMS 140 and verified using SD certificate.

In step 807, the node settings packages can be exported from the SD 120 to another removable storage (a flash drive) that can be used by an operator of the election data storage. In step 808, the node settings packages can be uploaded to the nodes 160 and verified by traversing a chain of certificates to the root certificate. In step 709, the EMS 140 can update nodes 160 of the election data storage settings via a direct connection using a network data transfer for the purpose of updating nodes settings.

Figure 9A:
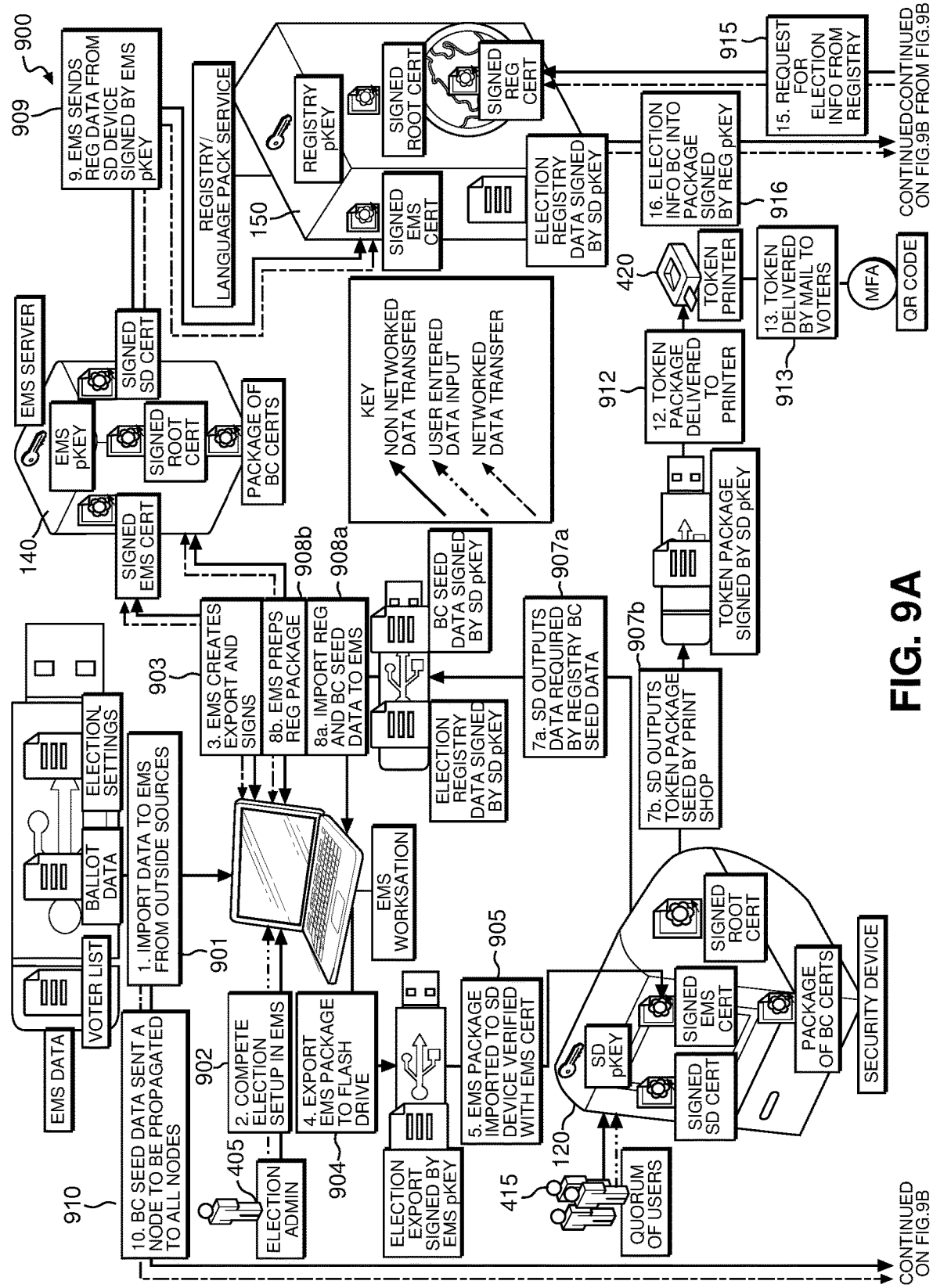
FIGS. 9A and 9B are high-level block diagrams showing steps of a process of pre-election tuning of an election system, according to an example embodiment.
Figure 9B:
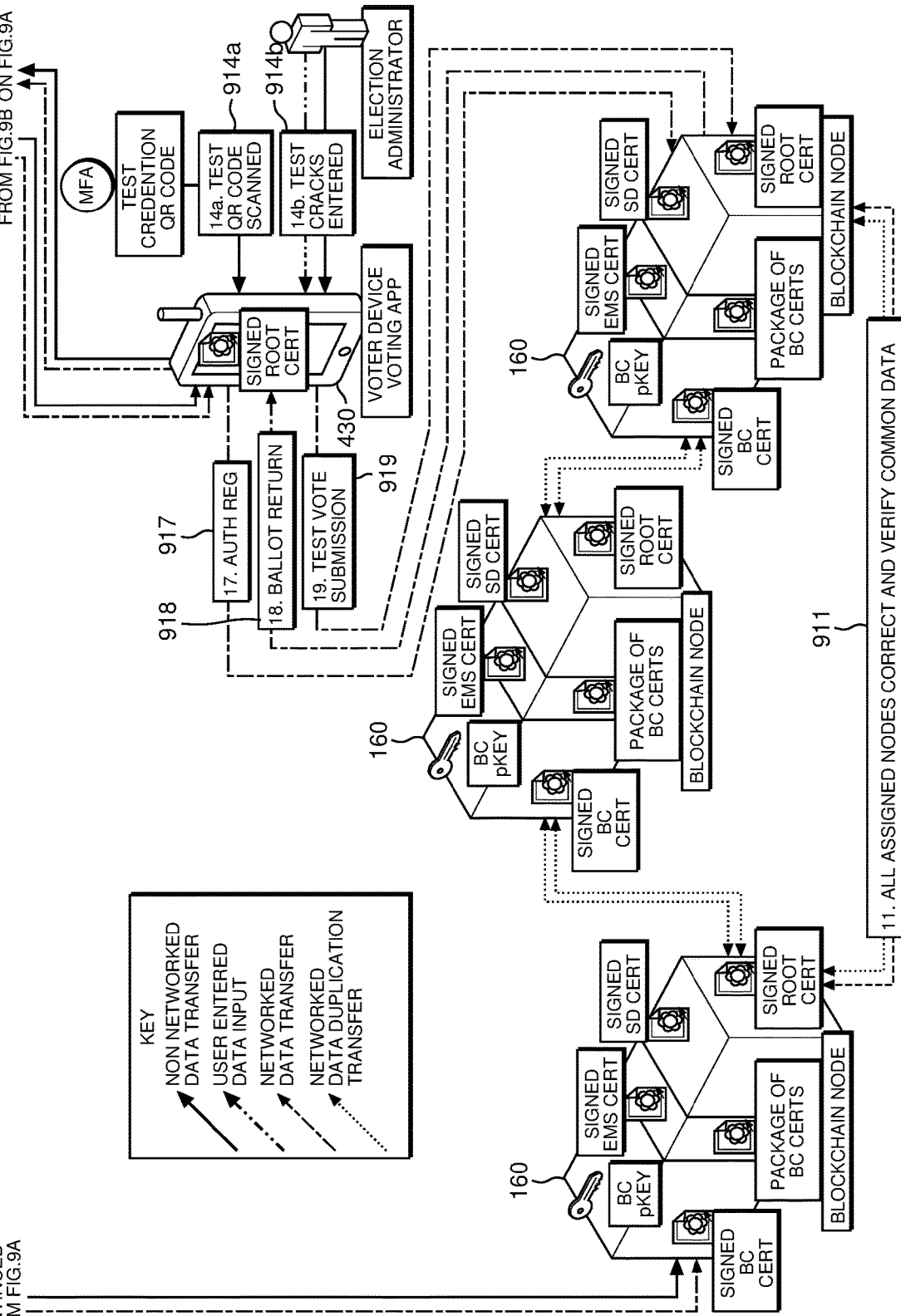

FIGS. 9A and 9B are high-level block diagrams showing steps of process 900 of pre-election tuning of an election system, according to an example embodiment. In step 901, election data can be imported to the EMS 140 from an outside source. The election data may include voter list, ballot data, and election settings. In step 902, election setup can be completed by an election administrator 405 using the EMS 140. In step 903, EMS 140 may create EMS packages and sign the EMS packages by EMS private keys. The EMS packages may include the election data.

In step 904, the EMS packages can be exported from the EMS 140 to a removable data storage (a flash drive). In step 905, the EMS packages can be imported from the removable data storage (a flash drive) to the SD 120 and verified with EMS certificates.

In step 905, a quorum of users 415 can initiate election creation process. In step 907a, the SD can output, to a removable data storage, election registry data required by the election registry 150 and node seed data required by the nodes 160 of the election data storage. The election registry data and the node seed data can be signed by SD private key. In step 907b, the SD 120 can output, to a removable data storage, token packages. The token packages can be signed by the SD private keys.

In step 908a, the election registry data and the node seed data can be imported to the EMS 140. In block 908b, the EMS may prepare registry packages. The registry packages may include election registry data prepared by the SD 120.

The registry packages can be signed by EMS private keys. In step 909, the EMS may send the registry packages to the election registry 150.

In step 910, the node seed data can be sent to one of the nodes 160 of election data storage and propagated to the rest of the nodes 160. In step 911, the nodes indicated in the node seed data can be connected to each other. The nodes can also verify common data.

In step 912, the token packages can be delivered to a token issuer, for example, a token printer, to print tokens for voters. The tokens may include QR codes. In step 913, the tokens can be delivered my mail to the voters.

In step 914*a*, a test QR code can be scanned by a voter device 430. The test QR can be associated test credential data. In step 914*b*, the credential data can be entered by an election administrator into the voter device 430. In step 915, the voter device 430 can send a request for election information to election registry 150. In step 916, the election registry 150 may send election information signed by election registry 150 to the voter device 430. The election information may include language packages and node identification. The node identification can be used by voting application on the voter device 430 to contact a correct node from the nodes 160 of the election data storage.

In step 917, the voter device 430 can send an authentication request to the nodes of the election data storage. The authentication request may include an election identification and a voter identification obtained from the QR code, and the node identification obtained from the election registry 150.

In step 918, the election data storage may send a ballot to the voter device 430. In step 919, the voter device 430 may send a test voter record generated based on choice in the ballot entered by the election administrator.

Figure 10:
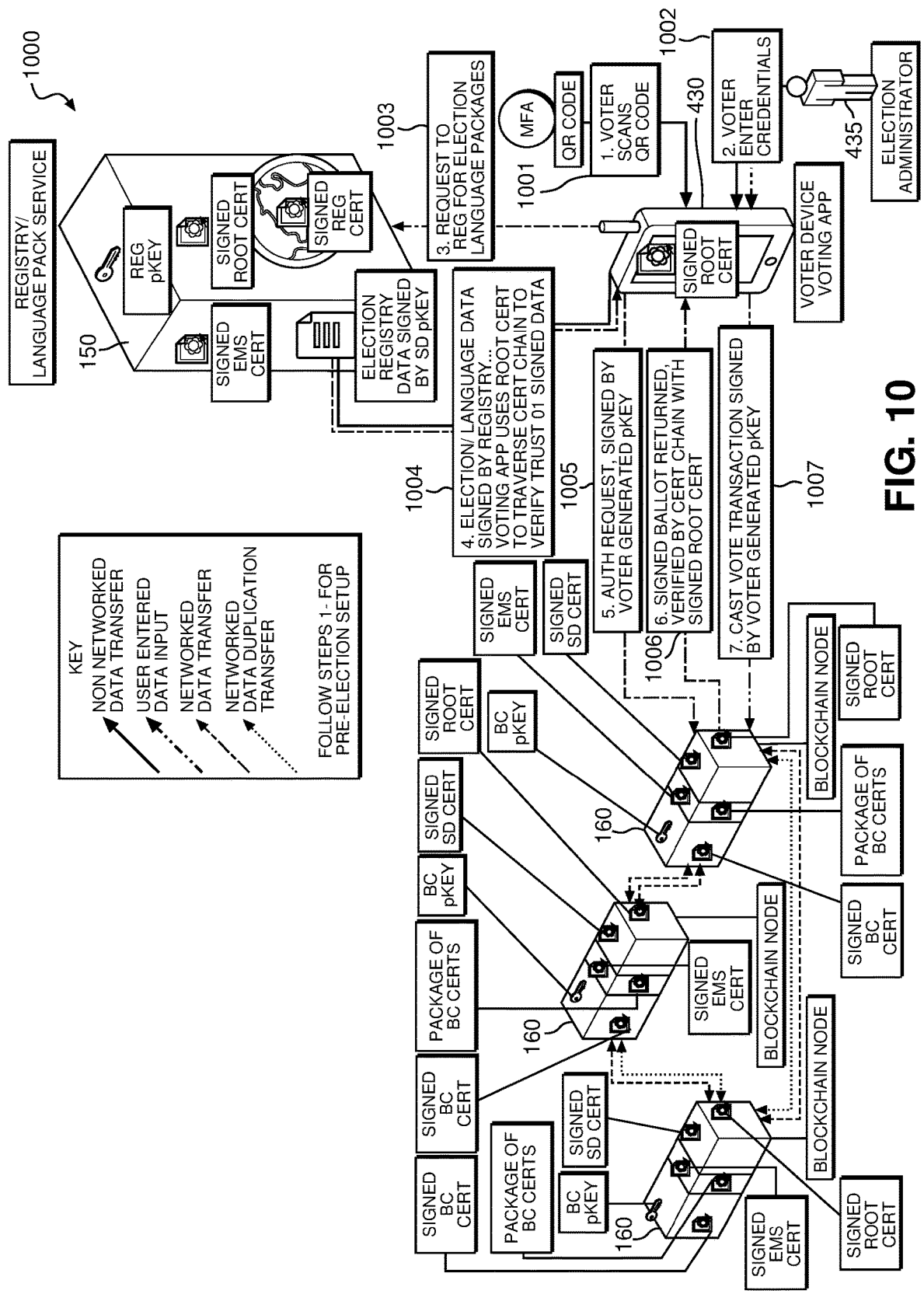
FIG. 10 is a high-level block diagram showing steps of a process of voting in an election system, according to an example embodiment.

FIG. 10 is a high-level block diagram showing steps of process 1000 of voting in an election system, according to an example embodiment. In step 1001, a voter device 430 can scan QR code from a token mailed to a voter 435. In step 1002, the voter 435 may enter voter credentials to the voter device 430. In step 1003, the voter device 430 can send a request for election information and language packages to election registry 150. In step 1004, the election registry 150 may send the election information and the language packages signed by election registry 150 to the voter device 430. The signed election information and language packages can be verified by traversing a chain of certificates to the root certificate. The election information may include node identification. The node identification can be used by voting application on the voter device 430 to contact a correct node from the nodes 160 of the election data storage.

In step 1005, the voter device 430 can send an authentication request to the nodes 160 of the election data storage. The authentication request can be signed by a private key generated by the voter device 430. The authentication request may include an election identification and a voter identification obtained from the QR code, and the node identification obtained from the election registry 150.

In step 1006, the election data storage may send a ballot to the voter device 430. The ballot can be signed by node certificates and verified by traversing a chain of certificates to the root certificate. In step 1007, the voter device 430 may send a cast vote record signed by the voter device private key. The cast vote record may include selection of choice in the ballot entered by the voter 435.

Figure 11A:
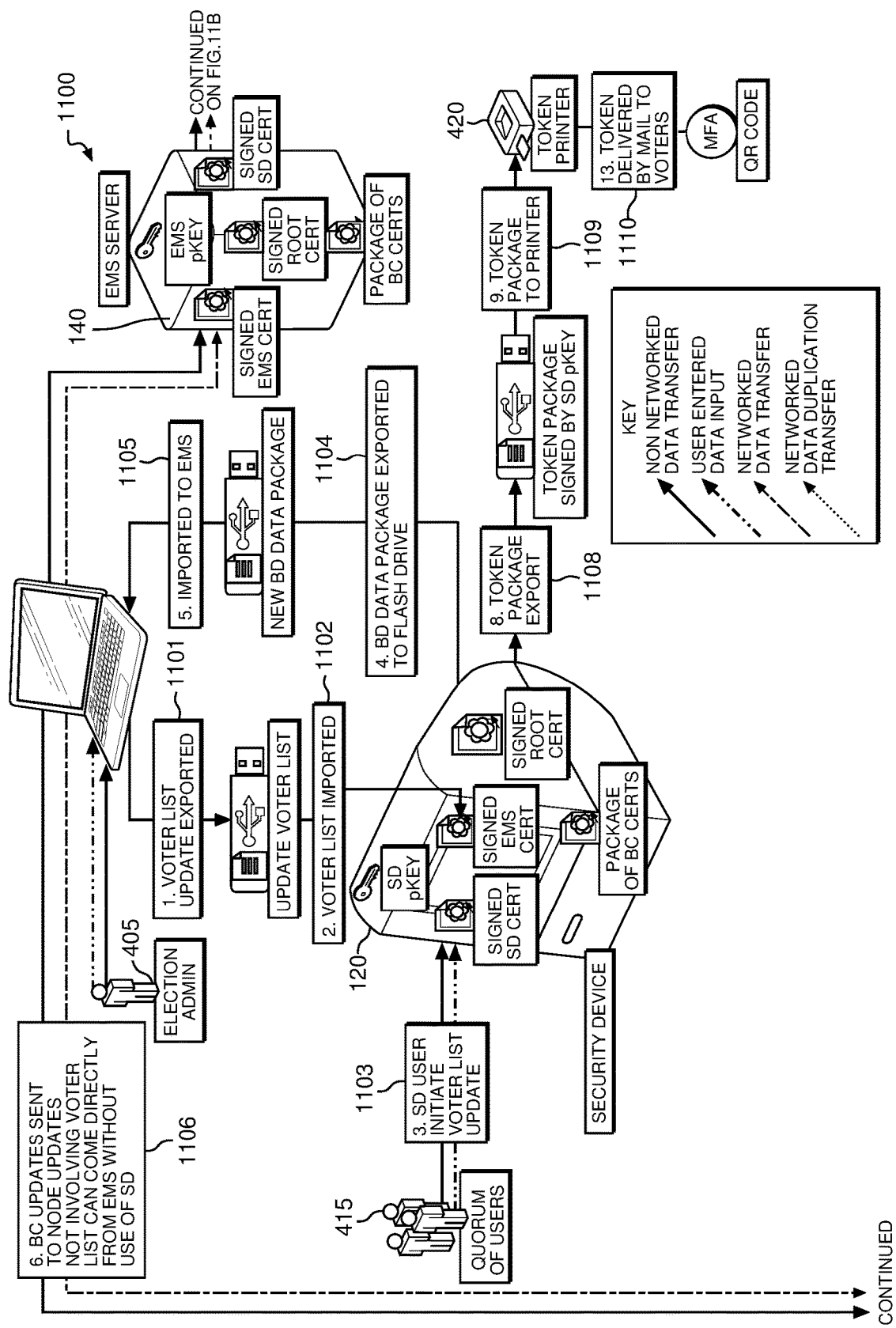
FIGS. 11A and 11B are high-level block diagrams showing steps of a process for updating data in an election system, according to an example embodiment.
Figure 11B:
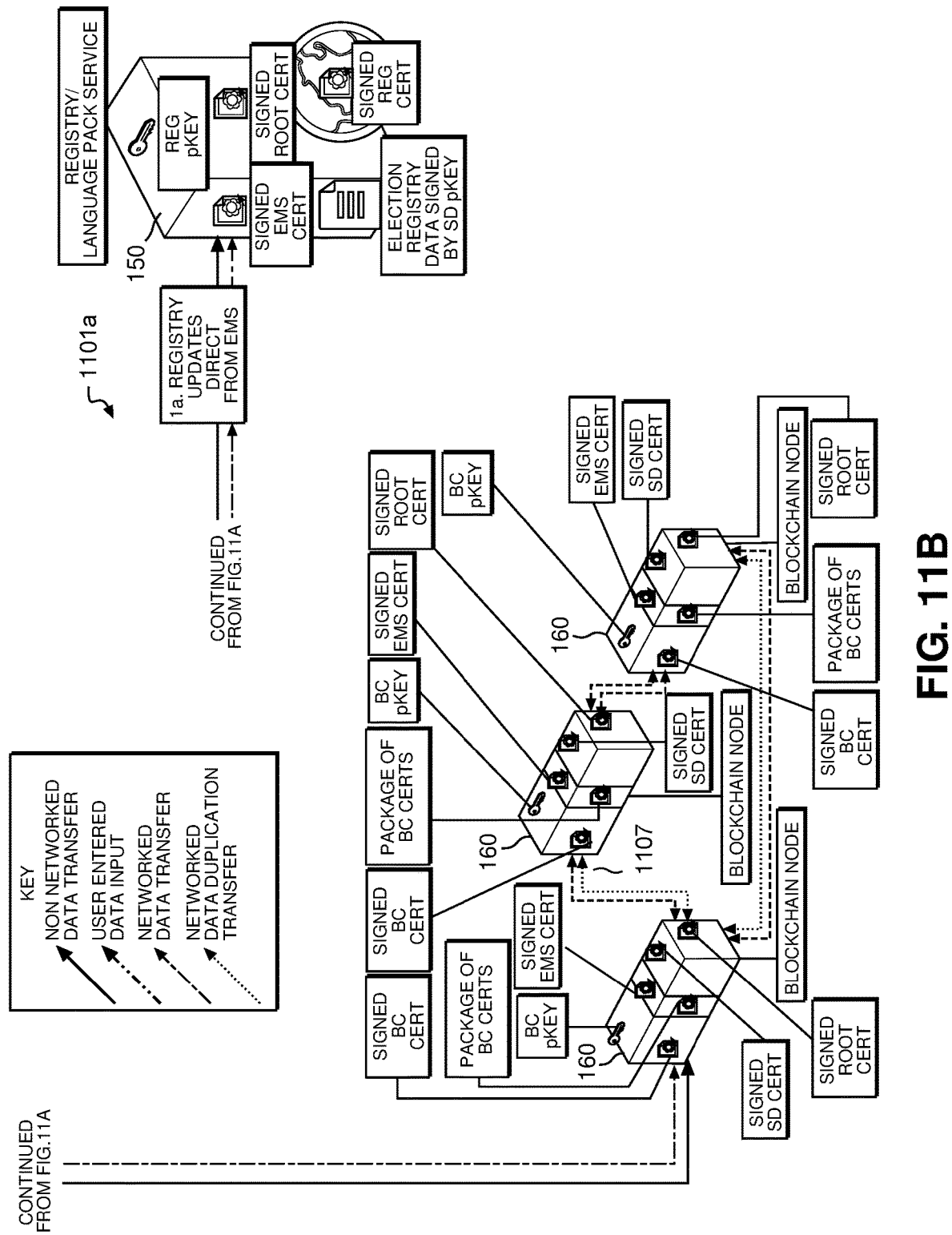

FIGS. 11A and 11B are high-level block diagrams showing steps of process 1100 of updating data in an election system, according to an example embodiment. In step 1101, a voter list update can be exported from EMS 140 to a removable data storage. In step 1101*a*, the EMS 140 may send a registry update to election registry 150.

In step 1102, the voter list update can be imported to the SD 120. In step 1103, a quorum of users may initiate update of the voter list on the SD 120. The SD 120 may sign the voter list update with a SD private key. The SD 120 may also generate and sign the node data packages. The node data packages may include the voter list update and node settings update. In step 1104, the node data packages can be exported from the SD 120 to a removable data storage. In step 1105, the node data packages can be imported to the EMS 140.

In step 1106, the node data packages (the voter list update and node settings update) can be sent to one of the nodes 160 of election data storage. In step 1107, the node data packages nodes can be propagated to the rest of the nodes 160 indicated in the node settings update.

In step 1108, the SD can output, to a removable data storage, token packages. The token packages can be signed by the SD private keys. In step 1109, the token packages can be delivered to a token issuer 420, for example a token printer, to print tokens for voters. The tokens may include QR codes. In step 1110, the tokens can be delivered my mail to the voters.

Figure 12:
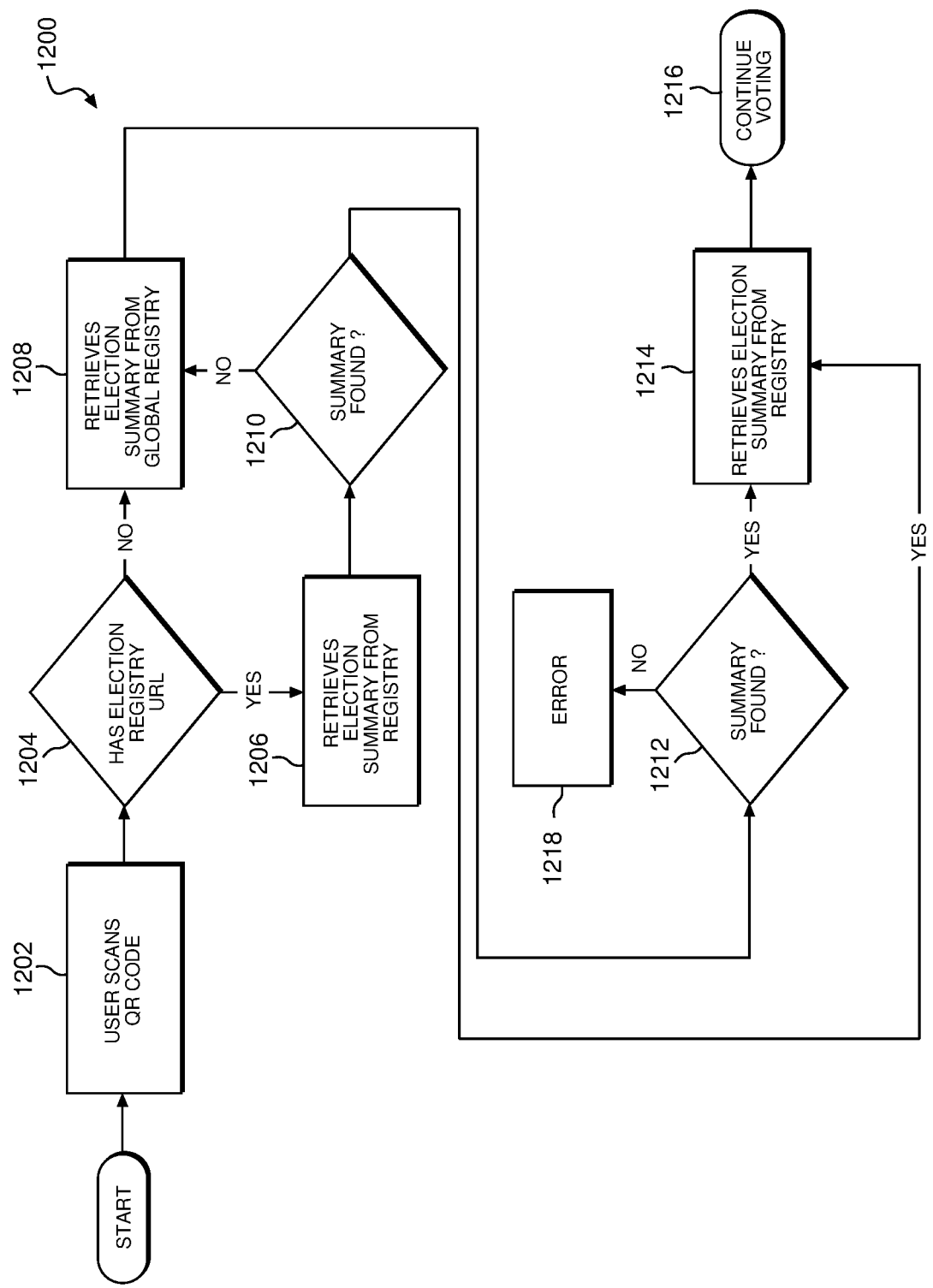
FIG. 12 is a flow chart showing a method for verification of a component of an election system, according to an example embodiment.

FIG. 12 is a flow chart showing a method 1200 for verification of components of an election system, according to an example embodiment. The method 1200 can commence with scanning a Quick Response (QR) code by a user in block 1202. Once scanned, the QR code can be analyzed to determine, in block 1204, whether the QR code has a Uniform Resource Locator (URL) of an election registry. If the URL is found in block 1204, an election summary is retrieved from the election registry in block 1206. If the URL is not found in block 1204 or if the election summary is not found in the election registry in block 1210, the election summary is retrieved from a global registry in block 1208.

If the election summary is not found in the global registry in block 1212, an error is identified in block 1218. If the election summary is found in the election summary in block 1210 and the election summary is found in the global registry in block 1212, the method 1200 continues with showing a login form in block 1214. The method 1200 further includes the step of continuing voting in block 1216.

Figure 13:
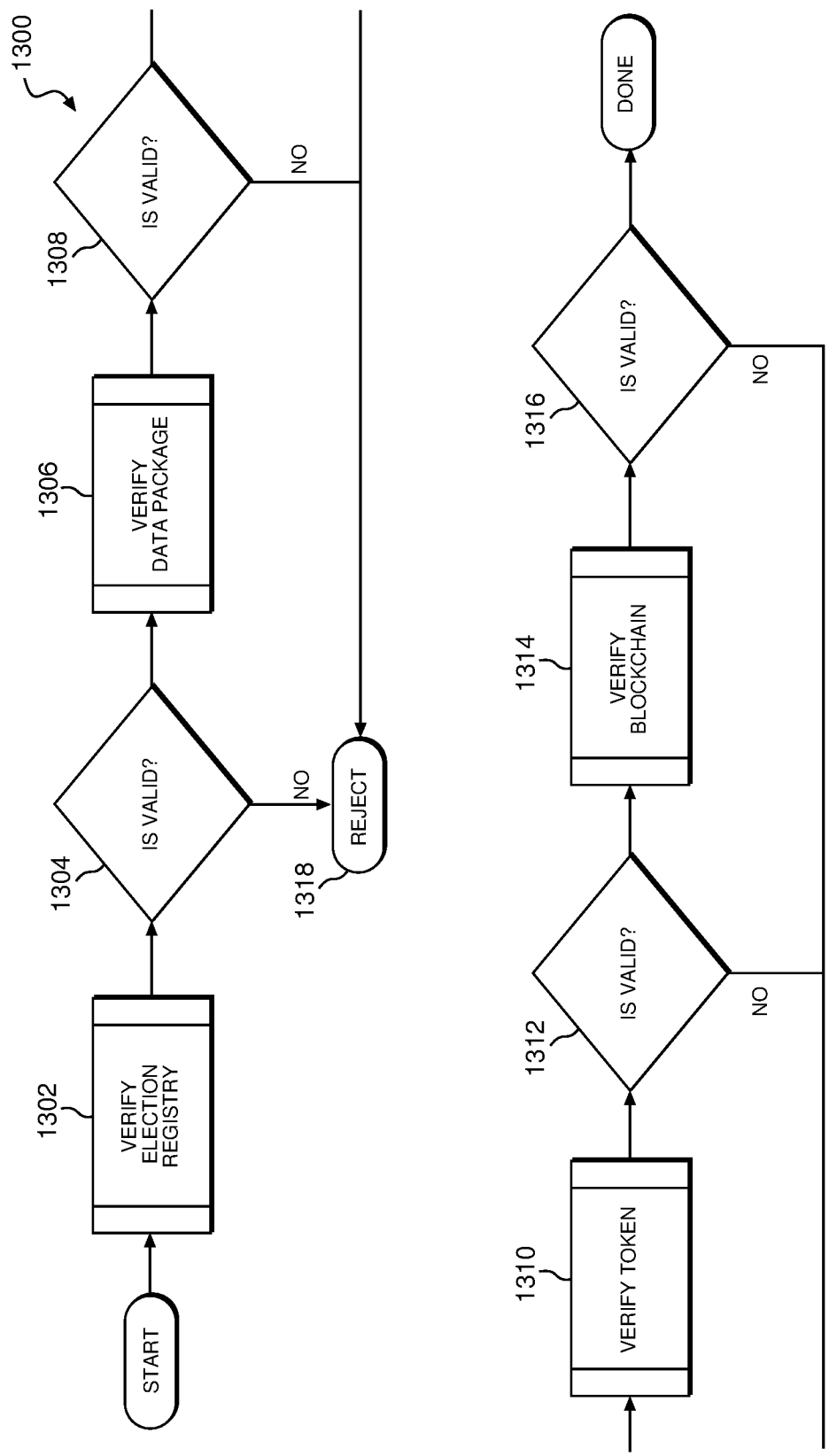
FIG. 13 is a flow chart showing a method for verification of a voting application, according to an example embodiment.

FIG. 13 is a flow chart showing a method 1300 for verification of a voting application, according to an example embodiment. The method 1300 can commence with verifying an election registry in block 1302. If it is determined, in block 1304, that the election registry is invalid, the verification is rejected in block 1318. If it is determined, in block 1304, that the election registry is valid, a data package is verified in block 1306. If it is determined, in block 1308, that the data package is invalid, the verification is rejected in block 1318. If it is determined, in block 1308, that the data package is valid, a token is verified in block 1310. If it is determined, in block 1312, that the token is invalid, the verification is rejected in block 1318. If it is determined, in block 1312, that the token is valid, a blockchain is verified in block 1314. If it is determined, in block 1316, that the blockchain is invalid, the verification is rejected in block 1318. If it is determined, in block 1316, that the blockchain is valid, the verification of the voting application is successfully completed.

Figure 14:
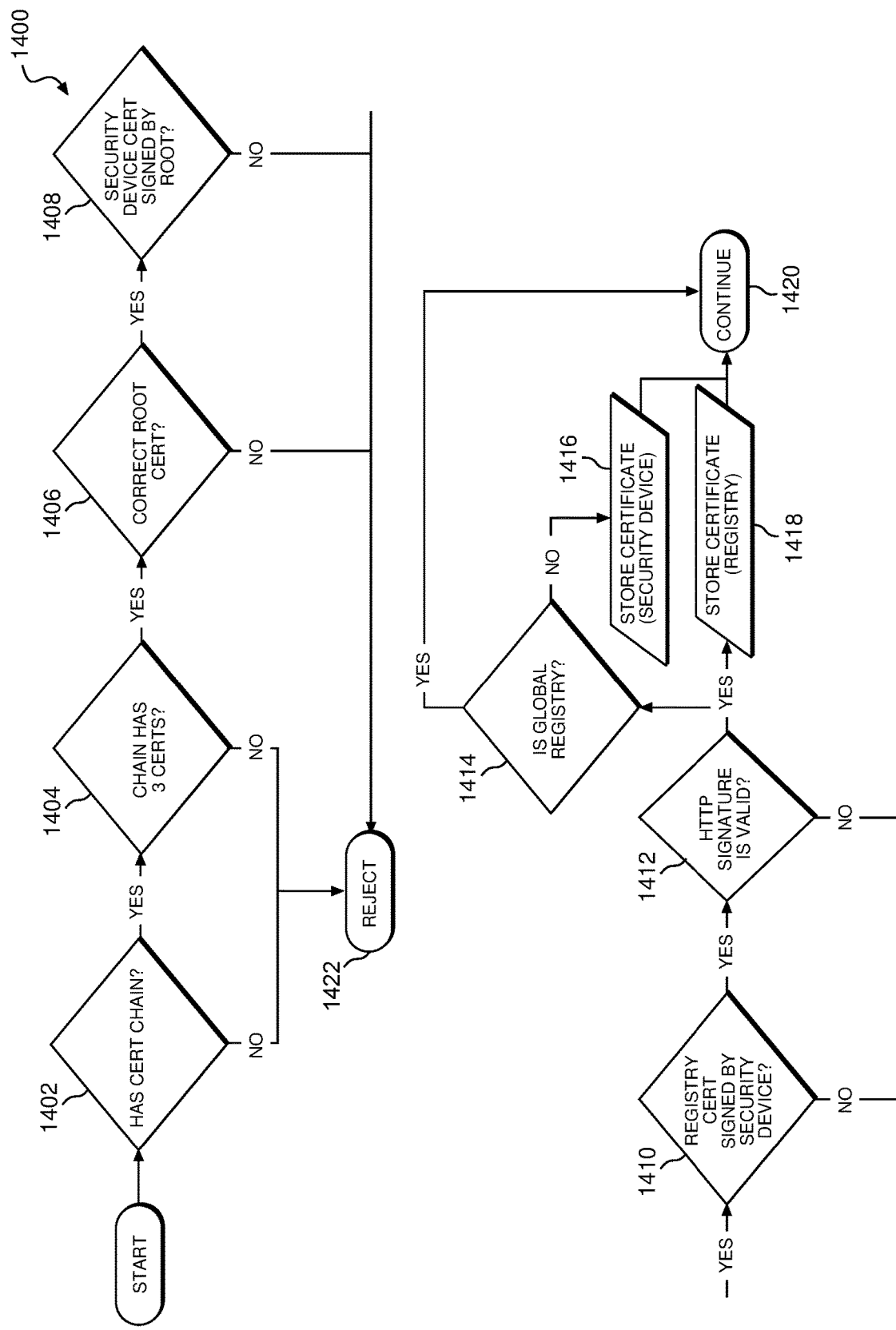
FIG. 14 is a flow chart showing a method for verification of an election registry, according to an example embodiment.

FIG. 14 is a flow chart showing a method 1400 for verification of an election registry, according to an example embodiment. The method 1400 can commence with verifying, in block 1402, whether the election registry has a certificate chain. If it is determined, in block 1402, that the election registry has no certificate chain, the verification is rejected in block 1422. If it is determined in block 1402 that the election registry has a certificate chain, the method 1400 proceeds with determining, in block 1404, whether the certificate chain has three certificates. If it is determined, in block 1404, that the certificate chain does not have three certificates, the verification is rejected in block 1422. If it is determined in block 1404 that the certificate chain has three certificates, the method 1400 continues with verifying, in block 1406, whether the root certificate is correct. If it is determined, in block 1406, that the root certificate is incorrect, the verification is rejected in block 1422. If it is determined in block 1406 that the root certificate is correct, the method 1400 continues with determining, in block 1408, whether a security device certificate is signed by the root certificate. If the security device certificate is not signed by the root certificate, the verification is rejected in block 1422. If the security device certificate is signed by the root certificate, the method 1400 continues with determining, in block 1410, whether a registry certificate is signed by the security device certificate. If the registry certificate is not signed by the security device certificate, the verification is rejected in block 1422. If the registry certificate is signed by the security device certificate, the method 1400 continues with determining, in block 1412, whether a HyperText Transfer Protocol (HTTP) signature is valid. If the HTTP signature is invalid, the verification is rejected in block 1422. If the HTTP signature is valid, the registry certificate is stored in block 1418 and it is further determined in block 1414 whether there is a global registry. If no global registry is found, the security device certificate is stored in block 1416. If the global registry is found in block 1414 and upon storing the registry certificate in block 1418, the verification of the election registry is successful, the method 1400 proceeds to block 1420 to perform further verifications.

Figure 15:
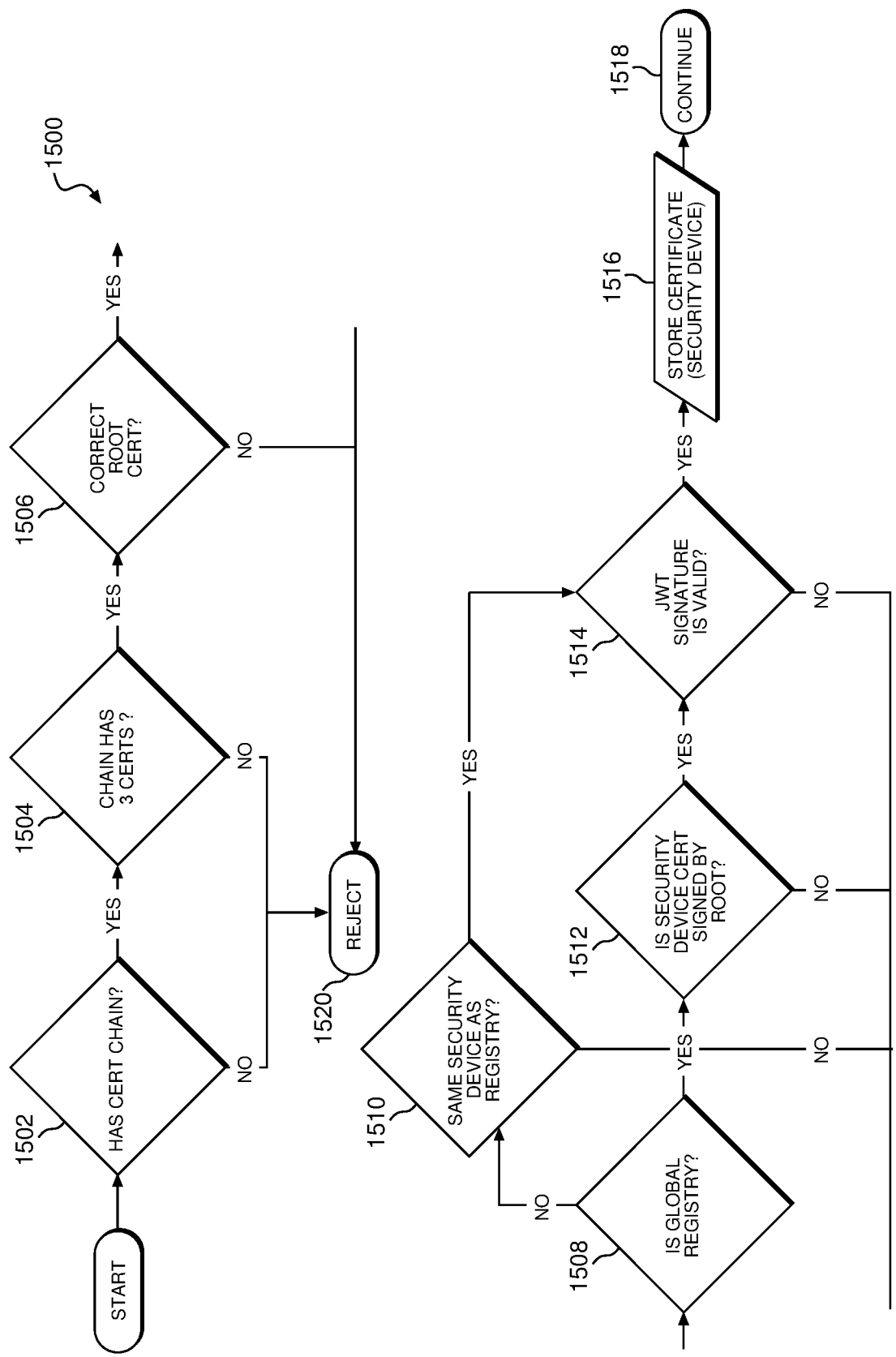
FIG. 15 is a flow chart showing a method for verification of data packages in an election system, according to an example embodiment.

FIG. 15 is a flow chart showing a method 1500 for verification of a data package in an election system, according to an example embodiment. In general, a data package is verified by checking that a certificate chain is valid, that the data package was signed by the correct security device (same as the registry), and that the signature is valid. This data is packed as a JSON Web Token (JWT) and contains the certificate chain in the header.

As shown in FIG. 15, the method 1500 commences with verifying, in block 1502, whether the data package has a certificate chain. If it is determined in block 1502 that the data package has no certificate chain, the verification is rejected in block 1520. If it is determined, in block 1502, that the data package has the certificate chain, the method 1500 further includes determining in block 1504 whether the certificate chain has three certificates. If it is determined, in block 1504, that the certificate chain does not have three certificates, the verification is rejected in block 1520. If it is determined, in block 1504, that the certificate chain has three certificates, the method 1500 continues with verifying, in block 1506, whether the root certificate is correct. If it is determined, in block 1506, that the root certificate is incorrect, the verification is rejected in block 1520.

If it is determined in block 1506 that the root certificate is correct, the method 1500 continues with determining in block 1508 whether there is a global registry. If it is determined in block 1508 that there is no global registry, the method 1500 continues with determining in block 1510 whether the same security devices operates as a registry. If the same security device does not operate as the registry, the verification is rejected in block 1520. If the same security device operates as the registry, the verification is successful and the method proceeds to block 1514.

If it is determined in block 1508 that there is a global registry, the method 1500 continues with determining in block 1512 whether the security device certificate is signed by a root certificate. If the security device certificate is not signed by the root certificate, the verification is rejected in block 1520. If the security device certificate is signed by the root certificate, the method proceeds to block 1514. In block 1514, the method 1500 proceeds to determine whether a JWT signature is valid. If the JWT signature is invalid, the verification is rejected in block 1520. If the JWT signature is valid, the security device certificate is stored in block 1516 and the method 1500 proceeds to block 1518 to perform further verifications.

Figure 16:
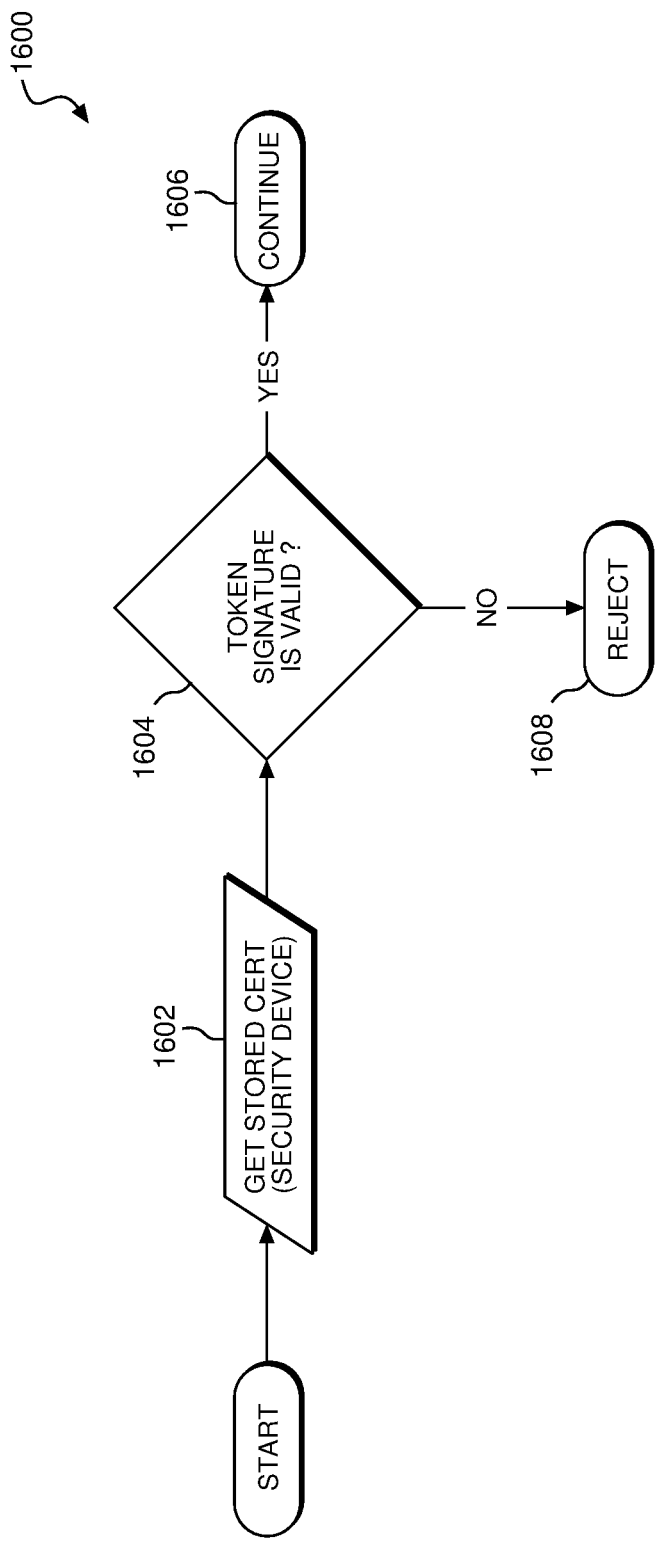
FIG. 16 is a flow chart showing a method for token verification in an election system, according to an example embodiment.

FIG. 16 is a flow chart showing a method 1600 for token verification in an election system, according to an example embodiment. The method 1600 commences with getting the stored security device certificate in block 1602. Block 1604 includes determining whether a token signature is valid. If the token signature is invalid, the token verification is rejected in block 1608. If the token signature is valid, the token verification is successful and the method 1600 proceeds to block 1606 to perform further verifications.

Figure 17:
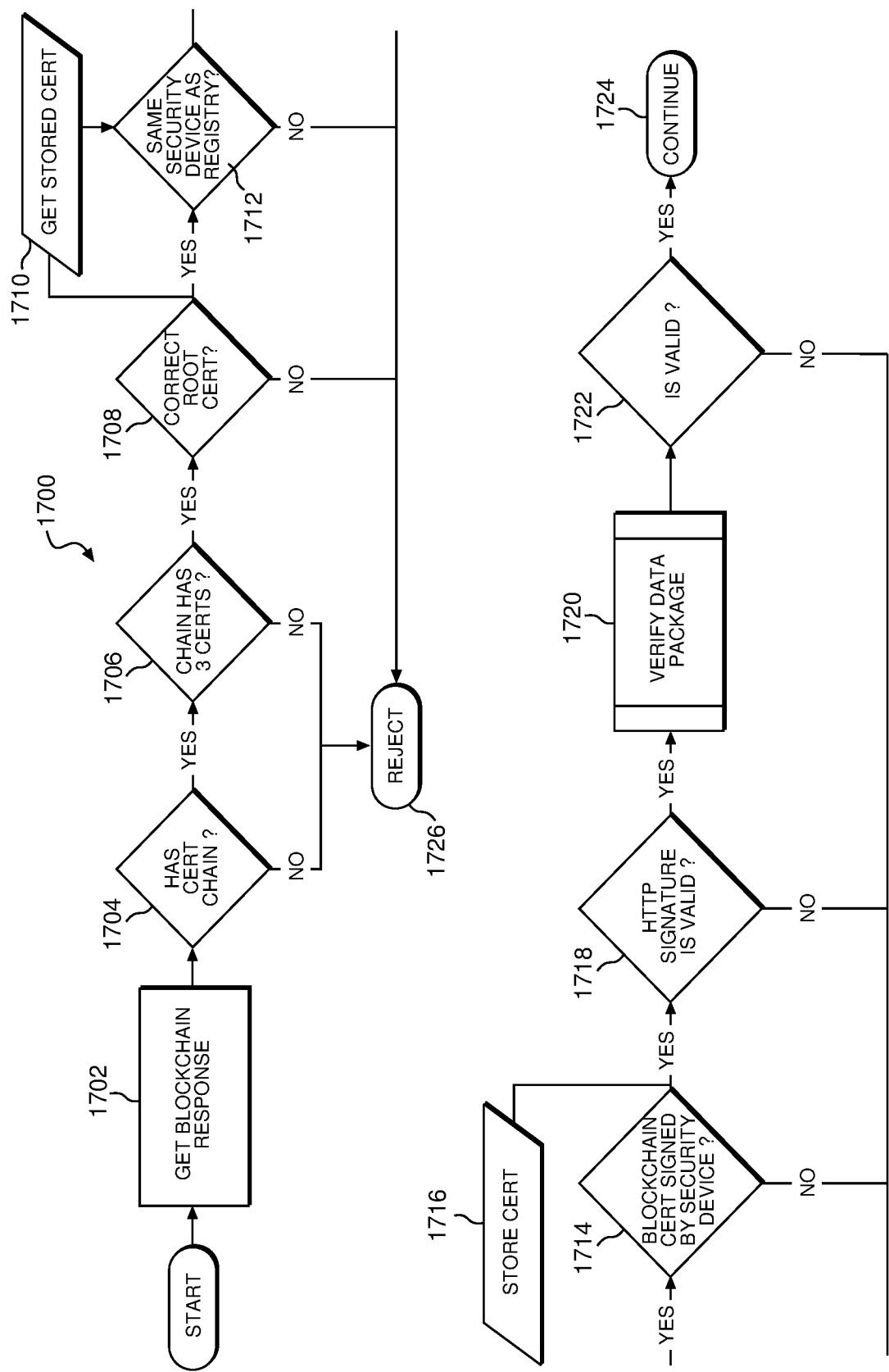
FIG. 17 is a flow chart showing a method for election data storage (blockchain) in an election system, according to an example embodiment.

FIG. 17 is a flow chart showing a method 1700 for verification of an election data storage (blockchain) in an election system, according to an example embodiment. In general, the election data storage is verified by using a special request against the network using the data retrieved from the registry. This request receives the security device certificate for an election. The returned certificate must be the same as the stored security device certificate, and the request and data are validated in a similar manner as the election registry verification. The purpose of this early check is to be sure that a connection with the correct election data storage can be established and in the event of an error a user can be notified as early as possible.

As shown in FIG. 17, the method 1700 commences with receiving a response from the election data storage in block 1702. The method 1700 continues with verifying, in block 1704, whether the election data storage has a certificate chain. If it is determined in block 1704 that the election data storage has no certificate chain, the verification is rejected in block 1726. If it is determined in block 1704 that the election data storage has the certificate chain, the method 1700 further includes determining in block 17006 whether the certificate chain has three certificates. If it is determined in block 1706 that the certificate chain does not have three certificates, the verification is rejected in block 1726. If it is determined in block 1706 that the certificate chain has three certificates, the method 1700 continues with verifying in block 1708 whether the root certificate is correct. If it is determined in block 1708 that the root certificate is incorrect, the verification is rejected in block 1726.

If it is determined in block 1708 that the root certificate is correct, the stored election data storage certificate is retrieved in block 1710. The method 1700 continues with determining in block 1712 whether the same security devices operates as a registry. If the same security device does not operate as the registry, the verification is rejected in block 1726. If the same security device operates as the registry, the method 1700 continues with determining in block 1714 whether the election data storage certificate is signed by the security device certificate. If the election data storage certificate is not signed by the security device certificate, the verification is rejected in block 1726.

If the election data storage certificate is signed by the security device certificate, the election data storage certificate is stored in block 1716. The method 1700 continues with determining in block 1718 whether an HTTP signature is valid. If the HTTP signature is invalid, the verification is rejected in block 1726. If the HTTP signature is valid, the data package is verified in block 1720. If it is determined in block 1722 that the data package is invalid, the verification is rejected in block 1726. If it is determined in block 1722 that the data package is valid, the verification of the election data storage is successful and the method 1700 proceeds to block 1724 to perform further verifications.

FIG. 18 is a flow chart showing a method 1800 for end to end verification of an election run over a public network, according to an example embodiment.

The method 1800 may commence in block 1805 with generating, by an election management system (EMS), EMS private keys and EMS certificates.

In block 1810, the method 1800 may proceed to generate, by a security device (SD), SD private key and a SD certificate. The SD private key and the SD certificate can be generated based on a root private key. The SD private key can be unremovable from the SD and inaccessible by a software application.

In block 1815, the method 1800 may include signing, by the SD, the EMS certificates using the SD private key. In block 1820, the method 1800 may include, upon receiving, by the SD, node settings signed by EMS certificates signing, by the SD, the node settings using the SD private key and generating, by the SD and for each of nodes of an election data storage, a package. The package may include a node private key, a node certificate, the EMS certificates, and the SD certificate.

In block 1825, the method 1800 may include, upon receiving, by the SD, election data signed by EMS certificates, signing, by the SD, the election data by the SD private key and generating, by the SD, at least one token signed by the SD private key. The token may include at least an election identification and a voter identification. The election data between the SD and the EMS can be transferred via a non-networked data transfer. The package between the SD and the nodes can be transferred via a non-networked data transfer. The election data between the EMS and the nodes can be transferred via a networked data transfer. The method 1800 may include, upon receiving, by the nodes of the election data storage, verifying, by the nodes, the election data using a chain including the EMS certificates and the SD certificates.

The method 1800 may include obtaining, by a voter device, the election identification and the voter identification from the at least one token. The method 1800 may include sending, by the voter device and based on the election identification and the voter identification, a request to the election data storage to receive a ballot. The method 1800 may include providing, by the voter device, a user interface enabling a voter to enter a choice on the ballot to form a cast vote record. The method 1800 may include sending, by the voter device, the cast vote record to the election data storage. The token can be provided to the voter by mail. The token may include a QR code and the voter device may include a mobile device configured to read the QR code.

The method 1800 may then receive, by the SD, registry settings signed by the EMS certificates and generate, by the SD, a registry private key and a registry certificate. The method 1800 may then proceed to storing, by the election registry, the registry private key, the registry certificate signed by the SD, the SD certificate, the EMS certificates, and the registry settings. The method 1800 may also include, upon receiving, by the election registry, updated settings signed by the EMS, verifying, by the election registry, the updated settings using a chain including the EMS certificates and the SD certificate.

The method 1800 may then proceed to sending, by the voter device, the election identification and the voter identification to the election registry. The method 1800 may include verifying, by the election registry and using the SD certificate, the election identification, and the voter identification. The method 1800 may include determining, by the election registry, a node identification associated with the election identification and the voter identification. The method 1800 may include sending, by the election registry, the node identification and the SD certificate to the voter device.

Figure 19:
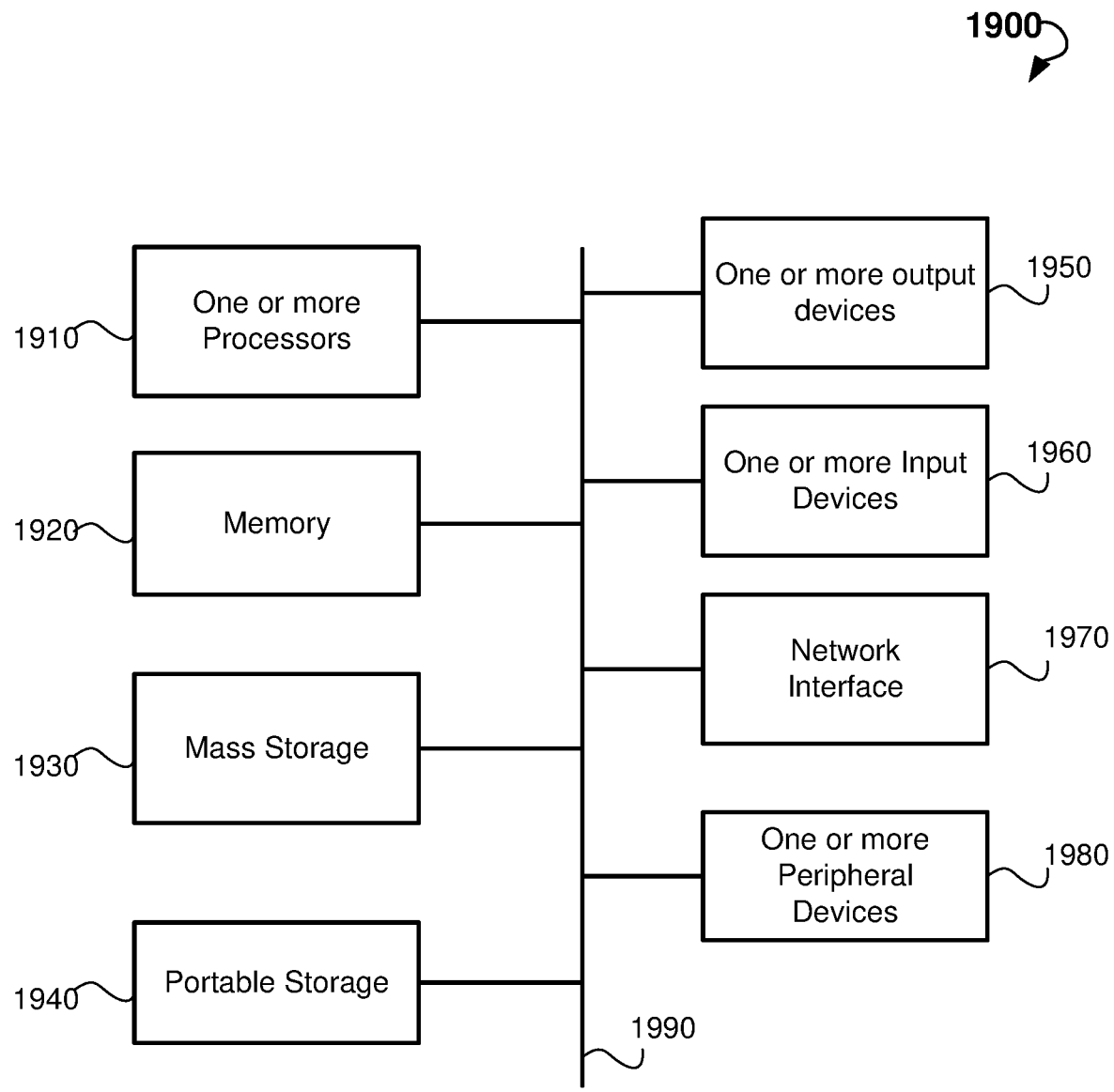
FIG. 19 shows a computing system that can be used to implement a system and method for providing end to end verification of an election run over a public network, according to an example embodiment.

FIG. 19 illustrates an exemplary computing system 1900 that can be used to implement embodiments described herein. The computing system 1900 can be implemented in the contexts of the EMS workstation 105, root certificate 110, security device 120, voter device 430, voting application 130, EMS 140, election registry 150, token issuer 420, and nodes 160. The exemplary computing system 1900 of FIG. 19 may include one or more processors 1910 and memory 1920. Memory 1920 may store, in part, instructions and data for execution by the one or more processors 1910. Memory 1920 can store the executable code when the exemplary computing system 1900 is in operation. The exemplary computing system 1900 of FIG. 19 may further include a mass storage 1930, portable storage 1940, one or more output devices 1950, one or more input devices 1960, a network interface 1970, and one or more peripheral devices 1980.

The components shown in FIG. 19 are depicted as being connected via a single bus 1990. The components may be connected through one or more data transport means. The one or more processors 1910 and memory 1920 may be connected via a local microprocessor bus, and the mass storage 1930, one or more peripheral devices 1980, portable storage 1940, and network interface 1970 may be connected via one or more input/output buses.

Mass storage 1930, which may be implemented with a magnetic disk drive or an optical disk drive, is a non-volatile storage device for storing data and instructions for use by a magnetic disk or an optical disk drive, which in turn may be used by one or more processors 1910. Mass storage 1930 can store the system software for implementing embodiments described herein for purposes of loading that software into memory 1920.

Portable storage 1940 may operate in conjunction with a portable non-volatile storage medium, such as a compact disk (CD) or digital video disc (DVD), to input and output data and code to and from the computing system 1900 of FIG. 19. The system software for implementing embodiments described herein may be stored on such a portable medium and input to the computing system 1900 via the portable storage 1940.

One or more input devices 1960 provide a portion of a user interface. The one or more input devices 1960 may include an alphanumeric keypad, such as a keyboard, for inputting alphanumeric and other information, or a pointing device, such as a mouse, a trackball, a stylus, or cursor direction keys. Additionally, the computing system 1900 as shown in FIG. 19 includes one or more output devices 1950. Suitable one or more output devices 1950 include speakers, printers, network interfaces, and monitors.

Network interface 1970 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth radio, and an IEEE 802.11-based radio frequency network, among others. Network interface 1970 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 1980 may include any type of computer support device to add additional functionality to the computing system. The one or more peripheral devices 1980 may include a modem or a router.

The components contained in the exemplary computing system 1900 of FIG. 19 are those typically found in computing systems that may be suitable for use with embodiments described herein and are intended to represent a broad category of such computer components that are well known in the art. Thus, the exemplary computing system 1900 of FIG. 19 can be a personal computer, handheld computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a central processing unit (CPU) for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Thus, systems and methods for providing end to end verification of an election run over a public network are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A system for providing end to end verification of an election run over a public network, the system comprising:
    an election data storage comprising one or more nodes;
    an election management system (EMS) comprises EMS memory and EMS processor, EMS memory storing computer executable instructions that when executed by the EMS processor cause the EMS processor to perform functions of:
  generating EMS private keys and EMS certificates;
    a security device (SD) comprises SD memory and SD processor, SD memory storing computer executable instructions that when executed by the SD processor cause the SD processor to perform functions of:
      generating an SD private key and an SD certificate, the SD private key and the SD certificate being generated based on a root private key;
      receiving the EMS certificates from the EMS;
      signing the EMS certificates using the SD private key;
      receiving node settings signed by EMS certificates;
      upon receiving the node settings signed by EMS certificates:
        signing the node settings using the SD private key;
        generating, for each of the one or more nodes, a node private key and a node certificate;
        generating, for each of the one or more nodes, a package including the node private key, the node certificate, the EMS certificates, and the SD certificate;
        transferring the generated package to the one or more nodes via a non-networked data transfer;
      receiving election data signed by EMS certificates from EMS via the non-networked data transfer;
      upon receiving the election data signed by EMS certificates:
        signing the election data using the SD private key; and
        generating at least one token signed using the SD private key, the at least one token including at least an election identification and a voter identification;
        sending the signed election data signed by SD private key and EMS certificates to the EMS via the non-networked data transfer;
  wherein the EMS processor further perform the functions of:
    receiving the package from one or more nodes;
    verifying the SD certificate using a root certificate;
    transferring the received signed election data to the one or more nodes via a networked data transfer.

2. The system of claim 1, wherein the SD private key is generated from a hardware chip of the SD and is unremovable from the SD.

3. The system of claim 1, wherein:
the one or more nodes are configured for receiving the election data and upon receiving the election data, the one or more nodes verify the election data using a chain including the EMS certificates and the SD certificates.

4. The system of claim 1, further including a voter device configured to:
receive the at least one token from the SD;
obtain the election identification and the voter identification from the at least one token;
send, based on the election identification and the voter identification, a request to the election data storage to receive a ballot;
provide a user interface enabling a voter to enter a choice on the ballot to form a cast vote record; and
send the cast vote record to the election data storage.

5. The system of claim 4, wherein the at least one token is provided to the voter by mail.

6. The system of claim 4, wherein:
the token includes a QR code; and
the voter device includes a mobile device configured to read the QR code.

7. The system of claim 4, further comprising an election registry, and wherein:
the SD is configured to receive registry settings signed using the EMS certificates, upon receiving the registry settings signed using the EMS certificates, the SD is further configured to generate a registry private key and a registry certificate; and
the election registry is configured to:
receive and store the registry private key, the registry certificate signed by the SD, the SD certificate, the EMS certificates, and the registry settings; and
receive updated settings signed by the EMS and upon receiving the updated settings signed by the EMS, verify the updated settings using a chain including the EMS certificates and the SD certificate.

8. The system of claim 7, wherein:
the voter device is configured to send the election identification and the voter identification to the election registry; and
the election registry is configured to:
verify, using the SD certificate, the election identification and the voter identification;
determine a node identification associated with the election identification and the voter identification; and
send the node identification and the SD certificate to the voter device.

9. The system of claim 8, wherein the election registry is configured to:
verify the election identification and the voter identification using the SD certificate;
determine a language package associated with the election identification and the voter identification; and
send the language package to the voter device.

10. A method for providing end-to-end verifiable proofs of vote casts in elections, the method comprising:
generating, by an election management system (EMS), EMS private keys and EMS certificates;
generating, by a security device (SD), an SD private key and an SD certificate, the SD private key and the SD certificate being generated based on a root private key;
receiving, by the SD, the EMS certificates from the EMS;
signing, by the SD, the EMS certificates using the SD private key;
receiving, by the SD, node settings signed by EMS certificates;
upon receiving, by the SD, the node settings signed by EMS certificates:
signing, by the SD, the node settings using the SD private key;
generating by the SD, for each of one or more nodes of an election data storage, a node private key and a node certificate; and
generating, by the SD and for each of the one or more nodes, a package including the node private key, the node certificate, the EMS certificates, and the SD certificate;
transferring by the SD, the generated package to the one or more nodes via a non-networked data transfer;
receiving, by the SD, election data signed by EMS certificates from EMS via the non-networked data transfer;
upon receiving, by the SD, the election data signed by EMS certificates:
signing, by the SD, the election data by the SD private key; and
generating, by the SD, at least one token signed by the SD private key, the at least one token including at least an election identification and a voter identification;
sending by the SD, the signed election data signed by SD private key and EMS certificates to the EMS via the non-networked data transfer;
receiving by the EMS, the package from one or more nodes;
verifying by the EMS, the SD certificate using a root certificate;
transferring by the EMS, the received signed election data to the one or more nodes via a networked data transfer.

11. The method of claim 10, wherein the SD private key is generated from a hardware chip of the SD and is unremovable from the SD.

12. The method of claim 10, further comprising:
receiving, by the one or more nodes of the election data storage the election data; and
upon receiving, by the one or more nodes of the election data storage, verifying, by the one or more nodes, the election data using a chain including the EMS certificates and the SD certificates.

13. The method of claim 10, further comprising:
receiving the at least one token from the SD;
obtaining, by a voter device, the election identification and the voter identification from the at least one token;
sending, by the voter device and based on the election identification and the voter identification, a request to the election data storage to receive a ballot;
providing, by the voter device, a user interface enabling a voter to enter a choice on the ballot to form a cast vote record; and
sending, by the voter device, the cast vote record to the election data storage.

14. The method of claim 13, wherein the at least one token is provided to the voter by mail.

15. The method of claim 13, wherein:
the at least one token includes a QR code; and
the voter device includes a mobile device configured to read the QR code.

16. The method of claim 13, further comprising:
receiving, by the SD, registry settings signed by the EMS certificates;
upon receiving, by the SD, the registry settings signed by the EMS certificates, generating, by the SD, a registry private key and a registry certificate;
storing, by an election registry, the registry private key, the registry certificate signed by the SD, the SD certificate, the EMS certificates, and the registry settings;
receiving, by the election registry, updated settings signed by the EMS; and
upon receiving, by the election registry, the updated settings signed by the EMS, verifying, by the election registry, the updated settings using a chain including the EMS certificates and the SD certificate.

17. The method of claim 16, further comprising:
sending, by the voter device, the election identification and the voter identification to the election registry;
verifying, by the election registry and using the SD certificate, the election identification and the voter identification;
determining, by the election registry, a node identification associated with the election identification and the voter identification; and
sending, by the election registry, the node identification and the SD certificate to the voter device.

18. A system for providing end to end verification of an election run over a public network, the system comprising:
an election data storage comprising one or more nodes;
an election management system (EMS) comprises EMS memory and EMS processor, EMS memory storing computer executable instructions that when executed by the EMS processor cause the EMS processor to perform functions of:
generating EMS private keys and EMS certificates;
a security device (SD) comprises SD memory and SD processor, SD memory storing computer executable instructions that when executed by the SD processor cause the SD processor to perform functions of:
generating an SD private key and an SD certificate, the SD private key and the SD certificate being generated based on a root private key;
receiving the EMS certificates from the EMS;
signing the EMS certificates by the SD private key;
receiving node settings signed by EMS certificates;
upon receiving node settings signed by EMS certificates:
signing the node settings by using the SD private key;
generating, for each of the one or more nodes, a node private key and a node certificate;
generating, for each of the one or more nodes, a package including the node private key, the node certificate, the EMS certificates, and the SD certificate;
transferring the generated package to the one or more nodes via a non-networked data transfer;
receiving election data signed by EMS certificates from EMS via the non-networked data transfer;
upon receiving election data signed by EMS certificates:
signing the election data by using the SD private key; and
generating at least one token signed by the SD private key, the at least one token including at least an election identification and a voter identification;
sending the signed election data signed by SD private key and EMS certificates to the EMS via the non-networked data transfer; and
a voter device comprises a voter device memory and a voter device processor, the voter device memory storing computer executable instructions that when executed by the voter device processor cause the voter device processor to perform functions of:
receiving the at least one token from the SD;
obtaining the election identification and the voter identification from the at least one token;
sending, based on the election identification and the voter identification, a request to the election data storage to receive a ballot;
providing a user interface enabling a voter to enter a choice on the ballot to form a cast vote record;
sending the cast vote record to the election data storage;
wherein the EMS processor further perform the functions of:
receiving the package from one or more nodes;
verifying the SD certificate using a root certificate;
transferring the received signed election data to the one or more nodes via a networked data transfer.

* * * * *